United States Patent
Hagan et al.

(10) Patent No.: US 7,526,485 B2
(45) Date of Patent: Apr. 28, 2009

(54) PRIVACY AND SECURITY METHOD AND SYSTEM FOR A WORLD-WIDE-WEB SITE

(75) Inventors: Thomas Hagan, Ho-Ho-Kus, NJ (US); David Levy, Sterlington, NY (US); Matthew Kamerman, Katonah, NY (US)

(73) Assignee: Alere Health Systems, Inc., Upper Saddle River, NJ (US)

( * ) Notice: Subject to any disclaimer, the term of this patent is extended or adjusted under 35 U.S.C. 154(b) by 132 days.

(21) Appl. No.: 11/175,402

(22) Filed: Jul. 7, 2005

(65) Prior Publication Data

US 2006/0004772 A1 Jan. 5, 2006

Related U.S. Application Data

(63) Continuation-in-part of application No. 09/469,102, filed on Dec. 21, 1999, now Pat. No. 6,734,886.

(51) Int. Cl.
*G06F 17/30* (2006.01)

(52) U.S. Cl. ............................. 707/10; 705/2; 705/18
(58) Field of Classification Search ............. 707/10
See application file for complete search history.

(56) References Cited

U.S. PATENT DOCUMENTS

| | | | | |
|---|---|---|---|---|
| 5,220,501 A | * | 6/1993 | Lawlor et al. | 705/40 |
| 5,592,553 A | * | 1/1997 | Guski et al. | 713/159 |
| 5,696,824 A | * | 12/1997 | Walsh | 705/75 |
| 5,754,938 A | | 5/1998 | Herz et al. | 455/4.2 |
| 5,768,382 A | * | 6/1998 | Schneier et al. | 380/251 |
| 5,790,668 A | | 8/1998 | Tomko | 380/25 |
| 5,815,665 A | * | 9/1998 | Teper et al. | 709/229 |
| 5,857,021 A | * | 1/1999 | Kataoka et al. | 705/54 |
| 5,875,302 A | | 2/1999 | Obhan | 395/202 |
| 5,890,129 A | * | 3/1999 | Spurgeon | 705/4 |
| 5,915,001 A | | 6/1999 | Uppaluru | 379/88.22 |
| 5,996,076 A | | 11/1999 | Rowney et al. | 713/201 |
| 6,006,333 A | * | 12/1999 | Nielsen | 726/8 |
| 6,016,480 A | | 1/2000 | Houvener et al. | 705/21 |
| 6,038,315 A | | 3/2000 | Strait et al. | 380/23 |
| 6,052,730 A | | 4/2000 | Felciano et al. | 709/225 |
| 6,317,834 B1 | | 11/2001 | Gennaro et al. | 713/186 |

OTHER PUBLICATIONS

Website:worldwideweb(www).oranz.co.uk/glossary_text.htm, Data Warehouse.*

* cited by examiner

*Primary Examiner*—Pierre M Vital
*Assistant Examiner*—Truong V Vo
(74) *Attorney, Agent, or Firm*—Whitham, Curtis, Christofferson & Cook, P.C.

(57) ABSTRACT

Personal information of users is used to customize the browsing experiences of the users on a World-Wide-Web site. To ensure privacy of the users' personal information, each user is assigned a unique Universal Anonymous Identifier (UAI). The UAI is generated by a trusted third party and provided to the Web site operator. The Web site operator then indexes the users' personal information by UAI. Only the user has the ability to correlate his/her true identity with his/her personal information.

24 Claims, 18 Drawing Sheets

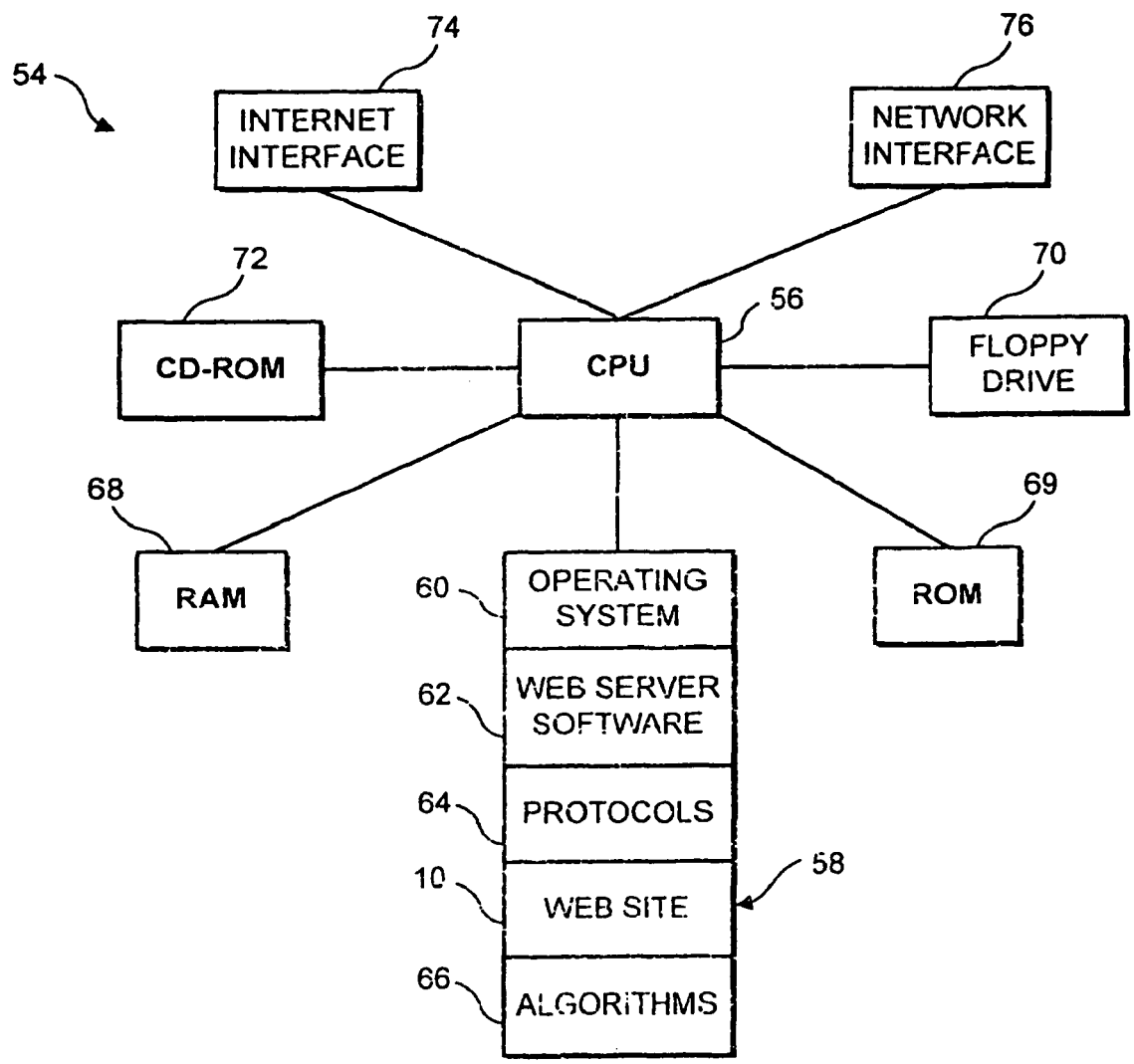
F I G. 2

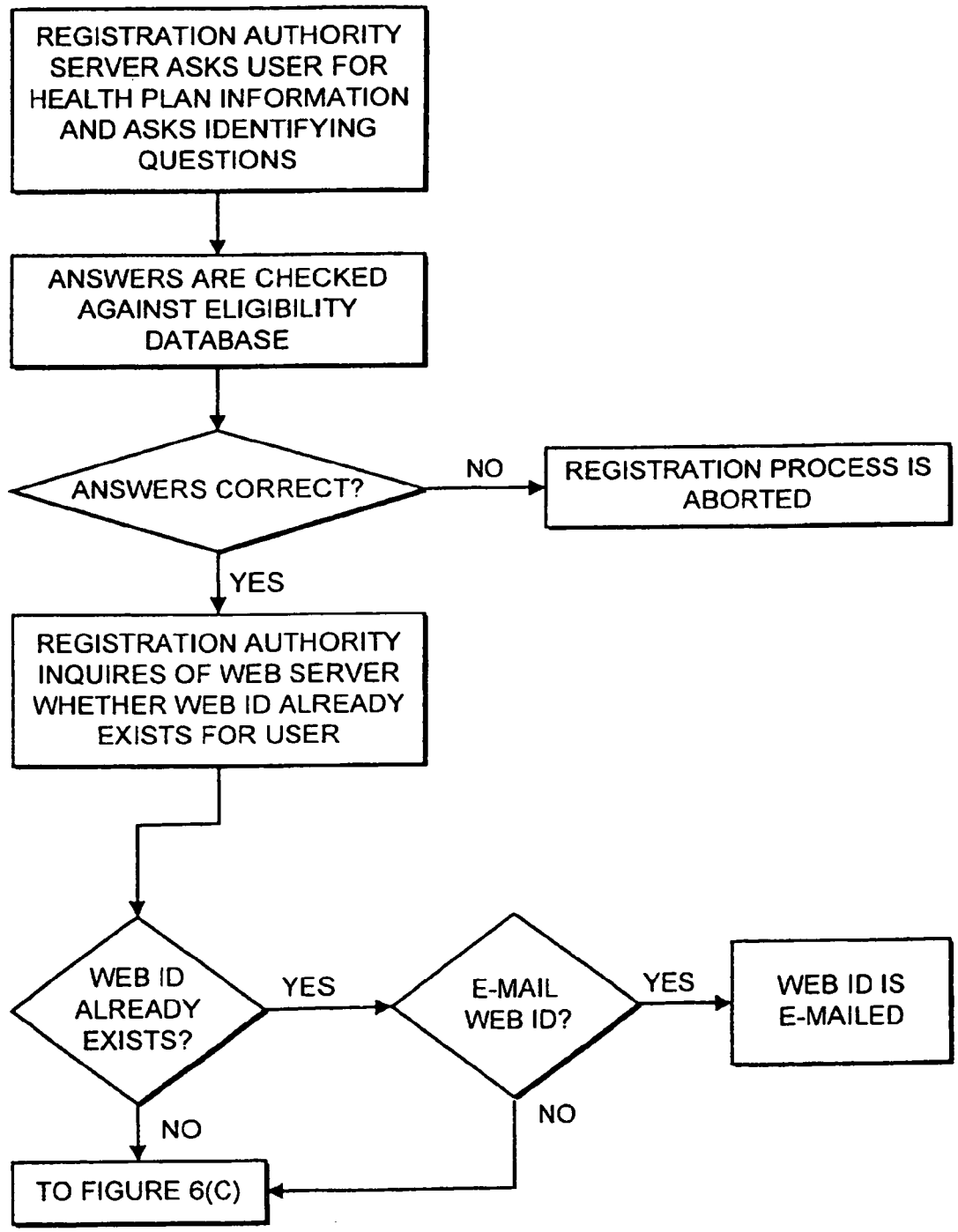
F I G. 6(B)

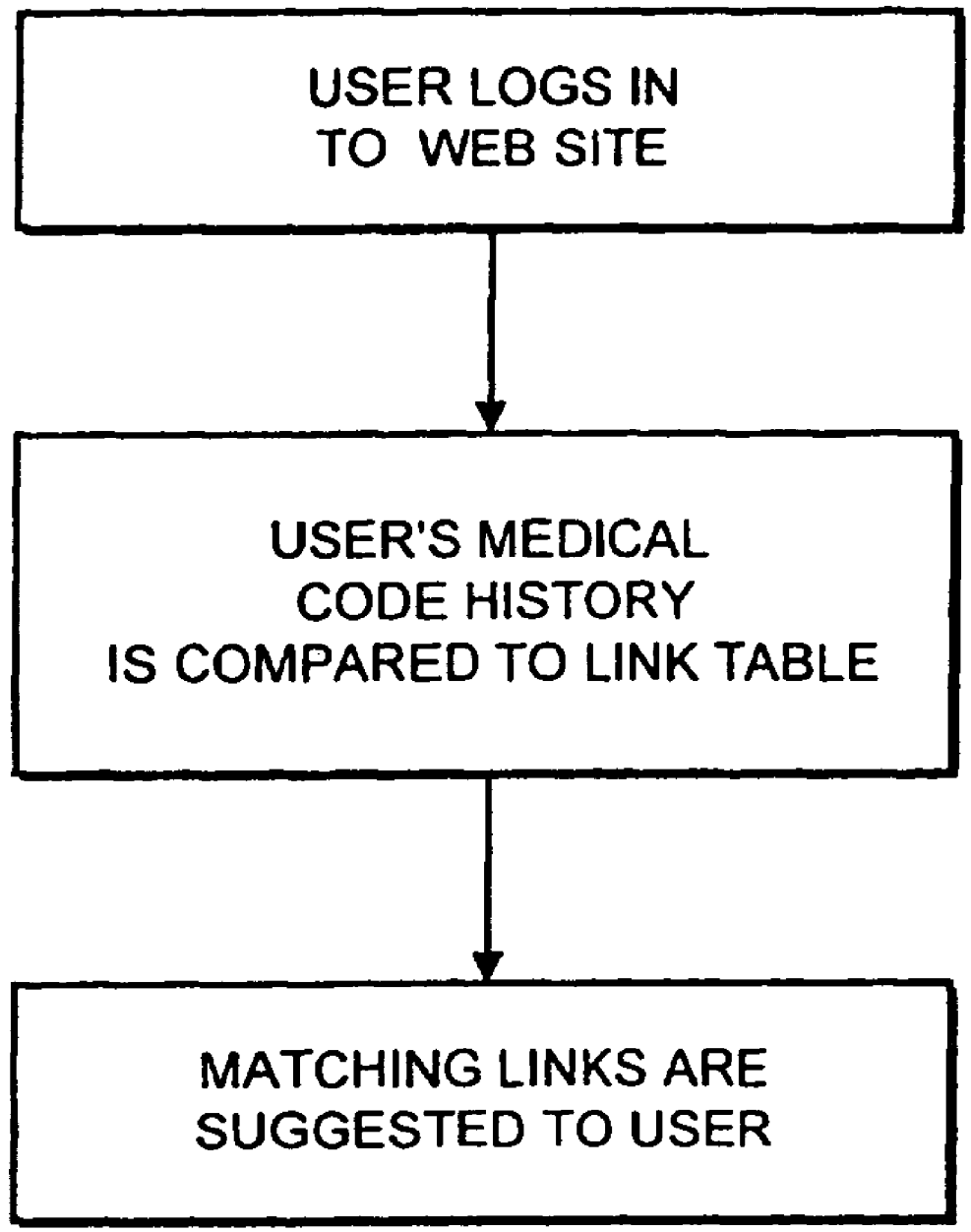
F I G. 10

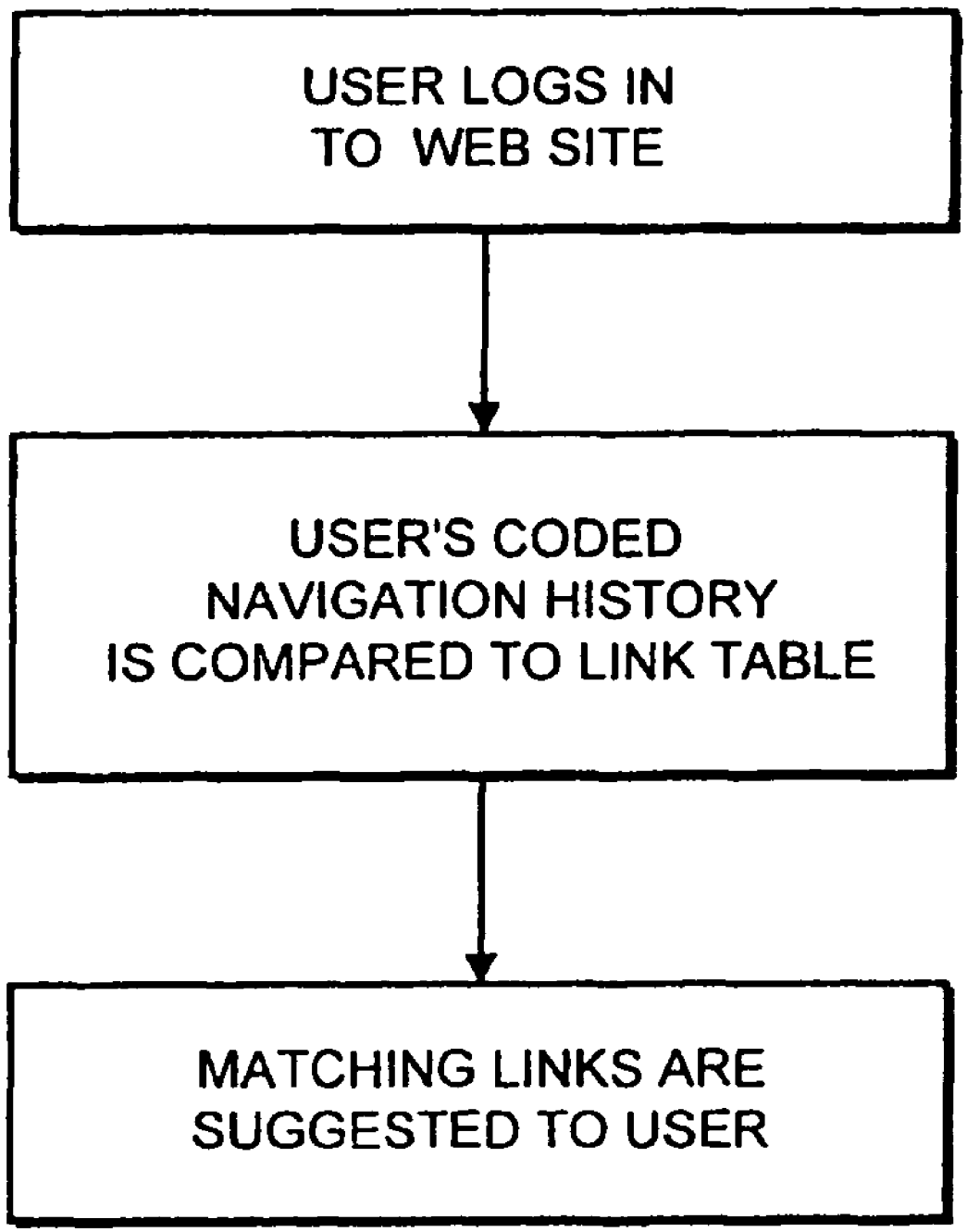
F I G. 12

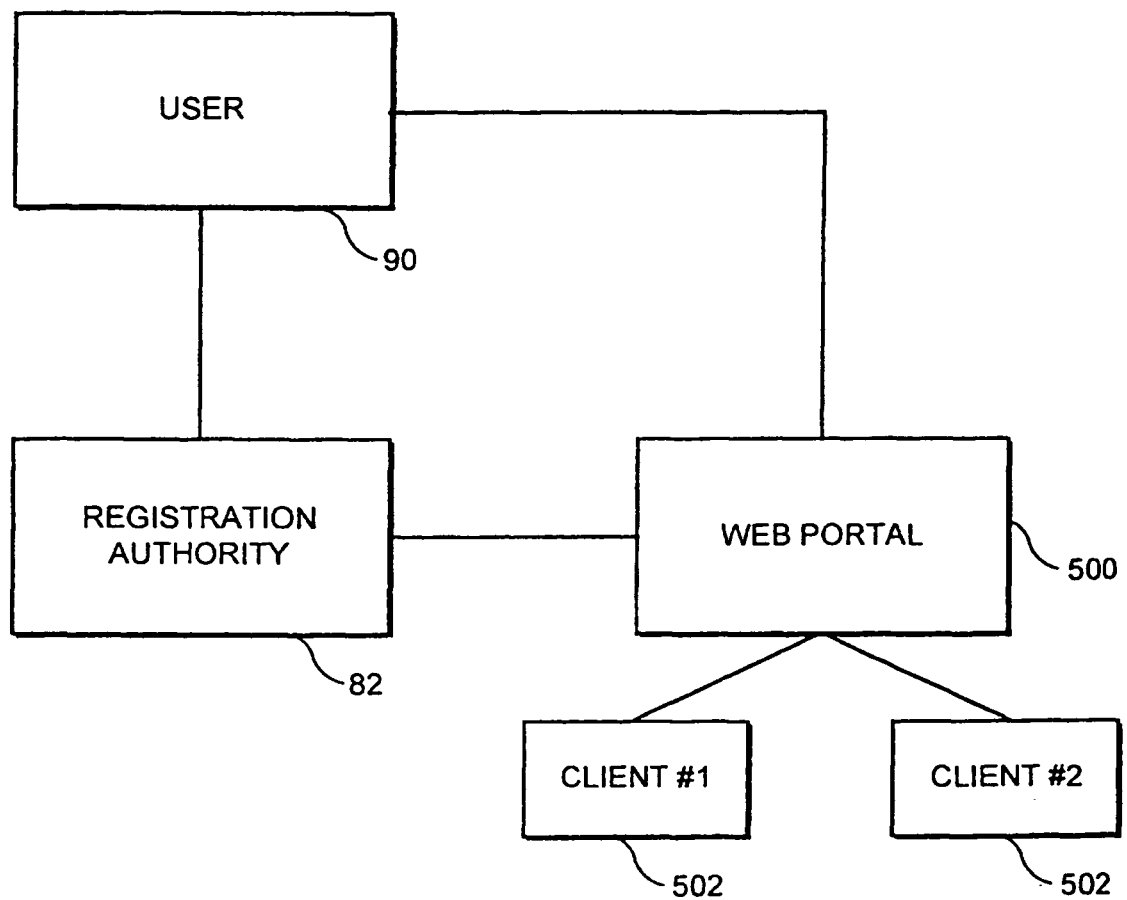
F I G. 14

PRIVACY AND SECURITY METHOD AND SYSTEM FOR A WORLD-WIDE-WEB SITE

CROSS-REFERENCE TO RELATED APPLICATIONS

This is a continuation-in-part of U.S. application Ser. No. 09/469,102, now U.S. Pat. No. 6,734,886, for "Method of Customizing a User's Browsing Experience on a World-Wide-Web Site," filed Dec. 21, 1999, the disclosure of which is incorporated by reference in its entirety as though fully set forth herein.

BACKGROUND OF THE INVENTION

1. Field of the Invention

The present invention relates to method of customizing a user's browsing experience on a World-Wide-Web site. More particularly, the present invention relates to a method of and system for customizing the browsing experience of a user of a healthcare related World-Wide-Web site based on the personal medical history of the user, including a method of and system for maintaining user privacy and security while using information contained in the user's medical history on that user's behalf.

2. Description of the Prior Art a. The Internet and World-Wide-Web

As those of ordinary skill in the art know, the Internet is a global computer network which comprises a vast number of computers and computer networks which are interconnected through communication links. The interconnected computers exchange information using various services, such as electronic mail, Gopher and the World Wide Web (hereinafter, the "WWW").

The WWW allows a server computer system (a Web server) to send graphical Web pages of information to a remote client computer system. The remote client computer system can then display the Web pages. Each Web page (or link) of the WWW is uniquely identifiable by a Uniform Resource Locator (URL). To view a specific Web page, a client computer system specifies the URL for that Web page in a request (e.g., a HyperText Transfer Protocol ("HTTP") request). The request is forwarded to the Web server that supports the Web page. When the Web server receives the request, it sends the Web page to the client computer system. When the client computer system receives the Web page, it typically displays the Web page using a browser. A browser is a special-purpose application program that effects the requesting of Web pages and the displaying of Web pages. Commercially available browsers include Microsoft Internet Explorer™ and Netscape Navigator™.

Web pages are typically defined using HyperText Markup Language ("HTML"). HTML provides a standard set of tags that define how a Web page is to be displayed. When a user indicates to the browser to display a Web page, the browser sends a request to the server computer system to transfer to the client computer system an HTML document that defines the Web page. When the requested HTML document is received by the client computer system, the browser displays the Web page as defined by the HTML document. The HTML document contains various tags that control the displaying of text, graphics, controls, and other features. The HTML document may contain URLs of other Web pages available on that server computer system or other server computer systems.

Because of its graphical and user friendly nature, the WWW is particularly well suited for e-commerce, i.e. the transacting of business on-line. Today, thousands of companies throughout the world provide goods and services to clients using Web sites. Users contact Web sites to obtain specific information or to obtain the goods and/or services being offered by a particular company. The present invention relates to a healthcare related Web site which is used to provide healthcare information and other services to clients.

b. Customization

In order to provide enhanced service to its users, a Web site may attempt to customize the browsing experience of its users on a user-by-user basis. A Web site will typically collect overt information from a user, such as interface preferences and content of interest, via forms and mouse clicks. Covert information, on the other hand, is collected by tracking the usage habits such as Web pages visited, time spent per page, frequency dates and times of visits, etc. This information is typically recorded in some combination of databases on the web application server and cookies on the user's browser. On subsequent visits by the user to the Web site, Web pages will be suggested to the user based on the user's prior browsing history.

This prior art method of customization, however, is limited in its usefulness since the browsing history of a user is not necessarily the best way to determine where a user may choose to browse in the future since the interests of the user may change from day to day. Ideally, the best way to customize a Web site browsing experience is to use personal information of the user in order to make an informed determination as to which Web pages are likely to be of interest to the user. This method, however, has not been heretofore possible since, even assuming the Web site has access to the user's personal information, a method for categorizing and quantifying the personal information in a way that will enable a programmed computer to manipulate the information so as to determine Web pages which are likely to be of interest to the user has been heretofore unknown.

When dealing with healthcare related Web sites, the issue of customization takes on added importance since the information being sought by the user will often relate to a medical problem of the user. A typical user, who is not medically trained, will not necessarily know which Web pages will be of help to him/her as it relates to his/her medical problem. Therefore, the ability to suggest Web pages to the user, which will be of interest and of help to the user, is of immeasurable value and importance.

Accordingly, it is an object of the present invention to provide a new method of customizing the browsing experience of users of a WWW site in general, and to provide a new method of customizing the browsing experience of users of a healthcare-related WWW site through use of the medical histories of the users in particular.

c. Internet Privacy

The issue of Internet privacy is one of the leading issues in cyberspace today, arising from the fact that many Web sites collect personal information from their users (e.g., a Web site which sell products may collect and store the name, address and credit card number of its customers). When dealing with highly sensitive information such as personal medical records, the issue of on-line privacy takes on added importance.

To protect privacy on the Internet, the United States has enacted legislation and has legislation pending designed to protect Internet users from misuse and unapproved dissemination of their personal information. Additionally, most Web sites use state of the art techniques to ensure the confidentiality of the data stored on their sites as well as data transferred over the Internet. Despite these efforts, as those of ordinary skill in the art know, personal information is not 100% secure on the Internet.

Accordingly, it is also an object of the present invention to provide a new method of ensuring the privacy of personal information on the Internet in general, and ensuring the privacy of medical records in particular.

Personal medical information has been used for quite some time by the medical industry without violating the privacy of the patients to whom the data refer. In most cases this is done by aggregating (summarizing collections of) the information into groups sufficiently large such that no individual can be identified. For uses where individual information is needed, this has been accomplished by the simple expedient of removing all information that can be used, either individually or in combination, to identify the name of the patient. In many cases the information does not have to be completely removed, but can be "weakened" to where it is non-identifying (e.g., replace birthday with birth year, or "before 1910" for patients where even the birth year might be identifying; replace zip code with Census Bureau Metropolitan Statistical Area (MSA) or equivalent). If an individual needs to be tracked over a number of data sources, a unique identifier (UID) is appended to the information in the place of a name or social security number. The supplier of the medical data knows who the UID refers to, but the user of the data does not. However, by combining all data held under a given UID, individuals can be tracked over many data sources, source records, and time periods.

The weaknesses of the UID approach for use on a third party, personalized Web site is threefold. First, supplier UIDs change with time, and are not consistent among suppliers. Therefore, a supplier-based UID is not valid within a supplier for more than a few years, and cannot be used to track a patient between suppliers at all. Second, using a supplier assigned UID might let the supplier inappropriately gather information provided by a patient to the third party Web site. Third, the standard UID scheme offers no mechanism by which a patient can access his/her medical data without the Web site knowing the identity of the patient.

The Universal Anonymous Identifier$^{SM}$ methodology presented herein is a significant enhancement of the state of the art in standard UID processing in the healthcare industry and solves the issues with the standard UID approach that are mentioned above.

SUMMARY OF THE INVENTION

In accordance with a first aspect of the present invention, a healthcare related Web site comprising a plurality of Web pages indexed by industry standard medical codes, such as ICD-9-CM, CPT-4, NDC and HCPCS J-codes, is provided.

As those of ordinary skill in the art know, ICD-9 coding is based on the official version of the World Health Organization's 9th Revision, International Classification of Diseases. ICD-9 is designed for the classification of morbidity and mortality information for statistical purposes, for the indexing of hospital records by disease and operations, and for data storage and retrieval. ICD-9 is an industry standard classification system. ICD-9-CM (The International Classification of Diseases, 9th Revision, Clinical Modification) is a clinical modification of ICD-9. The term "clinical" is used to emphasize the modification's intent to serve as a useful tool in the area of classification of morbidity data for indexing of medical records, medical care review, and ambulatory and other medical care programs, as well as for basic health statistics. To describe the clinical picture of the patient, the ICD-9-CM codes must be more precise than the ICD-9 codes which are intended only for statistical groupings and trend analysis.

CPT-4, or Current Procedural Terminology, Fourth Edition, is a systematic listing and coding of procedures and services performed by physicians. Each procedure or service is identified with a five digit code. The use of CPT-4 codes simplifies the reporting of services. With this coding and recording system, the procedure or service rendered by the physician is accurately identified. Inclusion of a descriptor and its associated specific five-digit identifying code number in CPT-4 is generally based upon the procedure being consistent with contemporary medical practice and being performed by many physicians in clinical practice in multiple locations. CPT-4 coding is an industry standard.

NDC (Food and Drug Administration (FDA), National Drug Code Directory) was originally established as an essential part of an out-of-hospital drug reimbursement program under Medicare. The NDC serves as a universal product identifier for human drugs. The current edition of the National Drug Code Directory is limited to prescription drugs and a few selected over-the-counter products.

The Health Care Financing Administration (HCFA) Common Procedure Coding System (HCPCS), Section 4541(a)(2) of the Balanced Budget Act (BBA) (P.L. 105-33), which added § 1834(k)(5) to the Social Security Act, requires that claims for outpatient rehabilitation services be reported using a uniform coding system. This coding requirement is effective for claims for outpatient rehabilitation services submitted on or after Apr. 1, 1998 and is needed to assure proper payment under a prospective payment system for outpatient rehabilitation services which will be effective Jan. 1, 1999. HCFA has chosen HCPCS as the uniform coding system. Section J of HCPCS reports drugs administered through other than an oral method (codes J0110 through J8999).

A user record for each user is maintained on the Web site containing the medical history of the user in medical code format. Based on a user's medical code history, the user's browsing experience on the site may be readily customized in a number of ways, some typical, but non-exhaustive examples of which will be described. According to one method, Web pages having medical codes similar to the user's medical code history may be suggested to the user upon log in to the Web site. According to another method, searches conducted by a user on the Web site may be automatically modified to search for Web pages relating to the medical code history of the user. According to yet another method, Web pages may be suggested to a user based on those Web pages visited by users with similar medical code histories. According to yet another method, profiles may be created into which users with similar medical code combinations may be grouped. Based on the navigation history of users within the same profile group, Web pages may be suggested to a user.

By using medical code indexing, the present invention also makes it possible to analyze statistically the browsing habits of users with similar medical conditions. This analysis forms the basis for providing customized service based on Web pages which are likely, statistically speaking, to be of interest to users with similar medical conditions.

In accordance with a second aspect of the present invention, a method of and system for ensuring the privacy and security of the users' personal records is provided. In one embodiment of the present invention, each user is assigned a unique Universal Anonymous Identifier (UAI) which is generated by a third party registration authority and provided to the Web site operator. The Web site operator then correlates and indexes the de-identified medical data by UAI. In one embodiment of the present invention, the UAI is encrypted under a key maintained by the registration authority before it is provided to the Web site operator.

In accordance with a third aspect of the present invention, a method of and system for registering a user with the Web site is provided. In one embodiment, the user is provided with a Web ID by the Web site and a password by a password server. In another embodiment, the user is provided with a digital certificate by a certificate authority server in addition to or in lieu of a password.

In accordance with a fourth aspect of the present invention, a method of processing communications between and among various system components is provided. In one embodiment, user communications are transmitted over a first computer network and site to site communications are transmitted over a second computer network, with transaction tokens being used to securely match communications. In another embodiment, user communications are transmitted over the public Internet and site to site communications are transmitted over a virtual private network within the public Internet.

The present invention will now be described in detail with frequent reference being made to the drawings identified below, in which identical numerals represent identical elements.

BRIEF DESCRIPTION OF THE DRAWINGS

In the accompanying drawings:

FIG. 2 is a schematic diagram of one of the many possible Web servers able to support the computational needs of the present invention;

FIGS. 6(a)-6(e) are a chart summarizing the steps in a new user registration via the Password server in accordance with one embodiment of the present invention;

FIG. 10 is a chart summarizing a first method of customization in accordance with one embodiment of the present invention;

FIG. 12 is a chart summarizing a third method of customization in accordance with one embodiment of the present invention; FIG. 14 is a schematic diagram of a system in accordance with an alternate embodiment of the present invention.

DETAILED DESCRIPTION OF THE PREFERRED EMBODIMENT

The present invention relates to a Web site which is used to provide healthcare related information and other related services to users. However, it will be realized by those of ordinary skill in the art that the concepts disclosed herein are not limited to use with healthcare related Web sites, but may be used with any type of Web site.

In particular, the present invention relates to PersonalPath Systems, Inc.'s ("PPSI") (the assignee of the present invention) Web site, PersonalPath$^{SM}$, which can be found on the Internet at www.personalpath.com. PersonalPath$^{SM}$ is a service provided by PPSI to health plans or other entities which have contracted with PPSI. Under the basic business model, health plan members may access the PersonalPath$^{SM}$ Web site to obtain healthcare related information and other services of interest to them. As discussed in detail below, the personal medical history of the users obtained from the health plan will be used to customize their respective browsing experiences on the Web site.

a. Web Site Architecture

Figure 1:
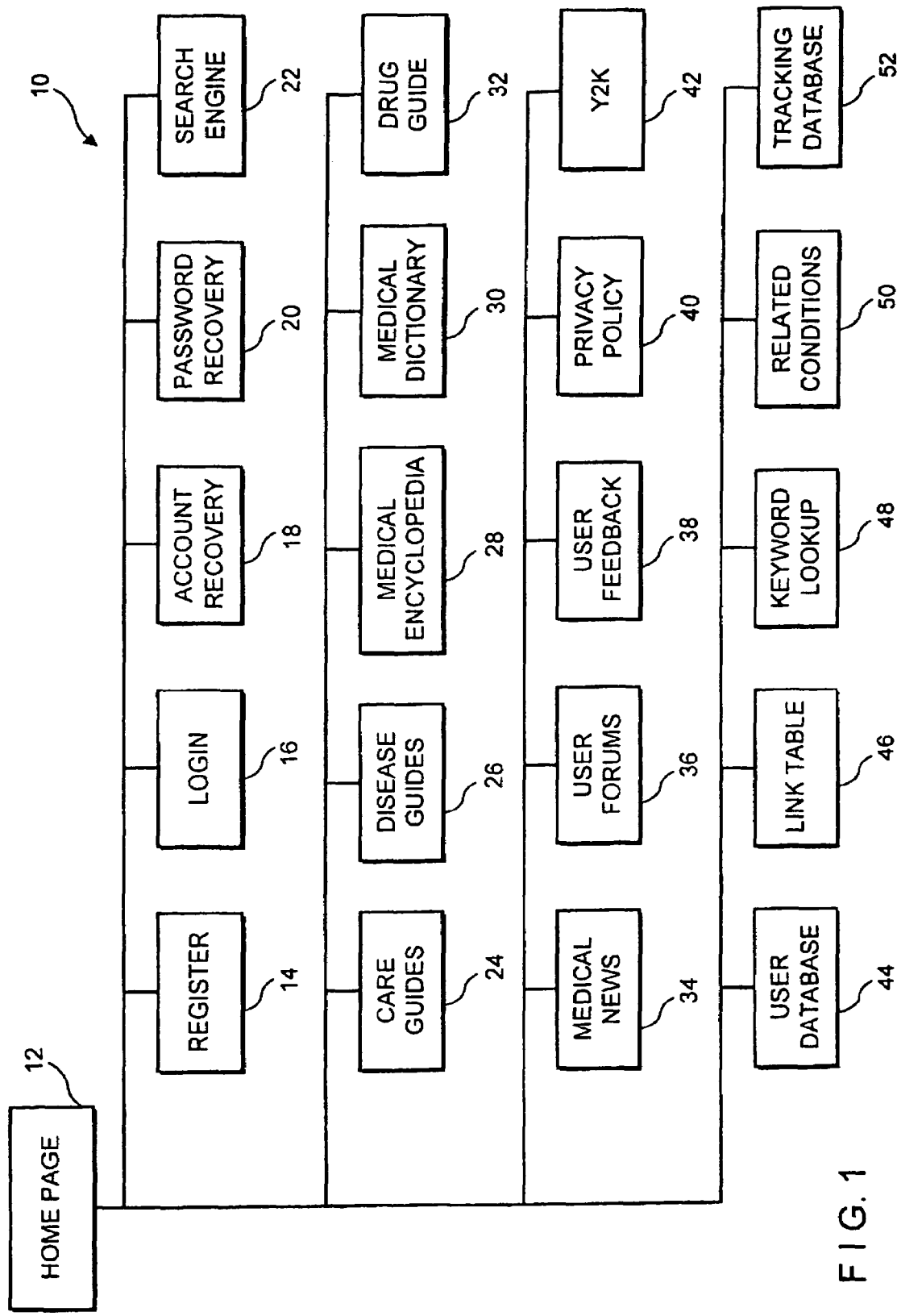
FIG. 1 is a site map of a Web site which may be used in accordance with one embodiment of the present invention.

A basic site map for a healthcare related Web site 10 which may be used to practice the present invention is shown in FIG. 1. It will be understood by those of ordinary skill in the art that the Web site architecture shown in FIG. 1 is merely illustrative and that any Web site architecture may be used to practice the present invention.

Referring to FIG. 1, the Web site 10 includes a home page 12; a registration page 14 which may be used by a new user to register with the Web site 10; a login page 16 into which a registered uses to gain access to the data on the Web site 10; an account recovery page 18; a password recovery page 20; and a search engine 22 which a user may use to search the Web site 10. The Web site 10 also includes care guides 24, disease guides 26, a medical encyclopedia 28, a medical dictionary 30 and a drug guide 32 which may be accessed by users to obtain medical information, and which can be customized based on the users' medical and navigation histories.

Care guides 24 address the many non-medical issues that face an ill person and their loved ones and are universally written for everyone who is sick, regardless of the disease. They focus on helping patients and their families obtain information, find resources, anticipate and solve problems, work with their doctors, and understand and navigate the health care system. Disease guides 26 provide user-friendly information on specific diseases. A medical encyclopedia 28, a medical dictionary 30 and a drug guide 32 which provide general medical information as well as information on medications, their dosages, actions, side effects, interactions with other medications, are also provided.

The Web site also includes miscellaneous pages such as a medical news page 34, a user forums page 36, a user feedback page 38, as well as a privacy policy 40 and a Y2K statement 42.

The Web site 10 also includes a series of databases which are not accessible by the Web site users, but which are used by the Web site 10 for administrative purposes, including customization. These databases include a user database 44 which contains the medical history of the Web site users in ICD-9-CM, CPT-4, NDC and HCPCS J-code formats; a link table 46 in which every Web page on the Web site is indexed by keyword (including individual words as well as phrases) ICD-9-CM, CPT-4, NDC and HCPCS J-code; a keyword to ICD-9-CM/CPT-4/NDC/HCPCS J-code look-up table 48 which correlates keywords to related ICD-9-CM, CPT-4, NDC and HCPCS J-codes; a table of related conditions 50 which correlates related ICD-9-CM, CPT-4, NDC and HCPCS J-codes; and a tracking database 52 which contains tracking information for each user of the Web site 10. The use of these various databases in customization will be discussed in greater detail below.

Referring to FIG. 2, the Web site 10 is located on a Web server 54. A Web server is a computer that provides World Wide Web services on the Internet. Such a computer includes the necessary hardware, operating system, Web server software, communications protocols and the Web site content (Web pages) to provide the services. It will be understood by those of ordinary skill in the art that the particular details of the Web server 54 are largely irrelevant to the present invention. So long as the Web server 54 is capable of performing the functions described herein, any configuration will suffice.

As shown in FIG. 2, the Web server 54 includes a central processing unit (CPU) 56 for controlling the operation of the Web server 54, a hard disk drive 58 which includes the operating system 60, the necessary Web server software 62, the communications protocols 64, the Web site 10 content and a set of algorithms 66 for performing the various functions described herein, a random access memory (RAM) 68, a read only memory (ROM) 69, a floppy drive 70, a CD-ROM drive 72, an Internet interface 74 which connects the Web server 54 to the Internet, and a network interface 76 which connects the Web server 54 to the Operator's internal computer network. A similar configuration may be used for the other web servers discussed herein (i.e., the Registration Authority server and Certificate Authority server).

A typical configuration for the Web server 54 includes an Intel IP L440GX Motherboard; a Dual Intel PIII 500 mhz Processor; 256 mb 100 mhz SDRAM; 9.1 gb Ultra2/SCSI Hard Disk Drive; a Creative Labs 52×CD ROM; 3.5" 1.44 mb Floppy Disk Drive; Dual Intel PRO/100+Dual Port Server Adapters; Antec Rackmount ATX Case; Microsoft Windows NT Server V4.0 Service Pack 5; Microsoft IIS Option Pack v4; and Microsoft Data Access Components.

The Web site 10 will also typically include standard security features such as fire-walls and DMZ's (de-militarized zones), SSL accelerators, intrusion detection systems, and assorted smart switches, routers, and hubs (not shown in the figures for clarity). These elements are standard with respect to Web site security and assist in preventing attackers and corrupt insiders from inappropriate access or operations on the Web site such as disrupting the system or attempting to disable the cryptographic components and replace them with something more accessible (such code substitutions are often called "a Trojan Horse attack" since they replace something trustworthy—the original cryptographic code—with something that can be used to assist future attacks).

b. Data Flow for Assimilating Plan Data

As discussed above, in accordance with the present invention, the Web site operator (hereinafter, the "Operator") will contract with a health plan administrator or other entity, such as an employer, (hereinafter, the "Health Plan") to provide healthcare or other services to members of the health plan (hereinafter, the "Users") via the Web site 10. As discussed in greater detail below, each User will have a unique Web ID and password (or certificate) which will enable the User to log on to the Web site 10 and gain access to the information and other services provided on the Web site 10 by the Operator.

Those of ordinary skill in the art will appreciate that while the present discussion focuses on the transfer of data from Health Plans, the present invention is not limited to Health Plans. Thus, for example, the data may be provided by an employer who has contracted with the Operator to provide healthcare services to its employees. Nor is the present invention limited to healthcare information. Those of ordinary skill in the art will appreciate that the present invention may be used in connection with any type of information, including, but not limited to, financial, actuarial, or benefits information, such as 401k information, pension transactions, life/disability insurance coverages, and payroll information.

Because the Users' personal medical histories will be used to customize their respective browsing experiences, measures must be taken to ensure the confidentiality of this information. In accordance with the present invention, this confidentiality is ensured in that the Operator is only provided with de-identified clinical data which is indexed by a Universal Anonymous Identifier$^{SM}$, or UAI$^{SM}$.

Figure 3:
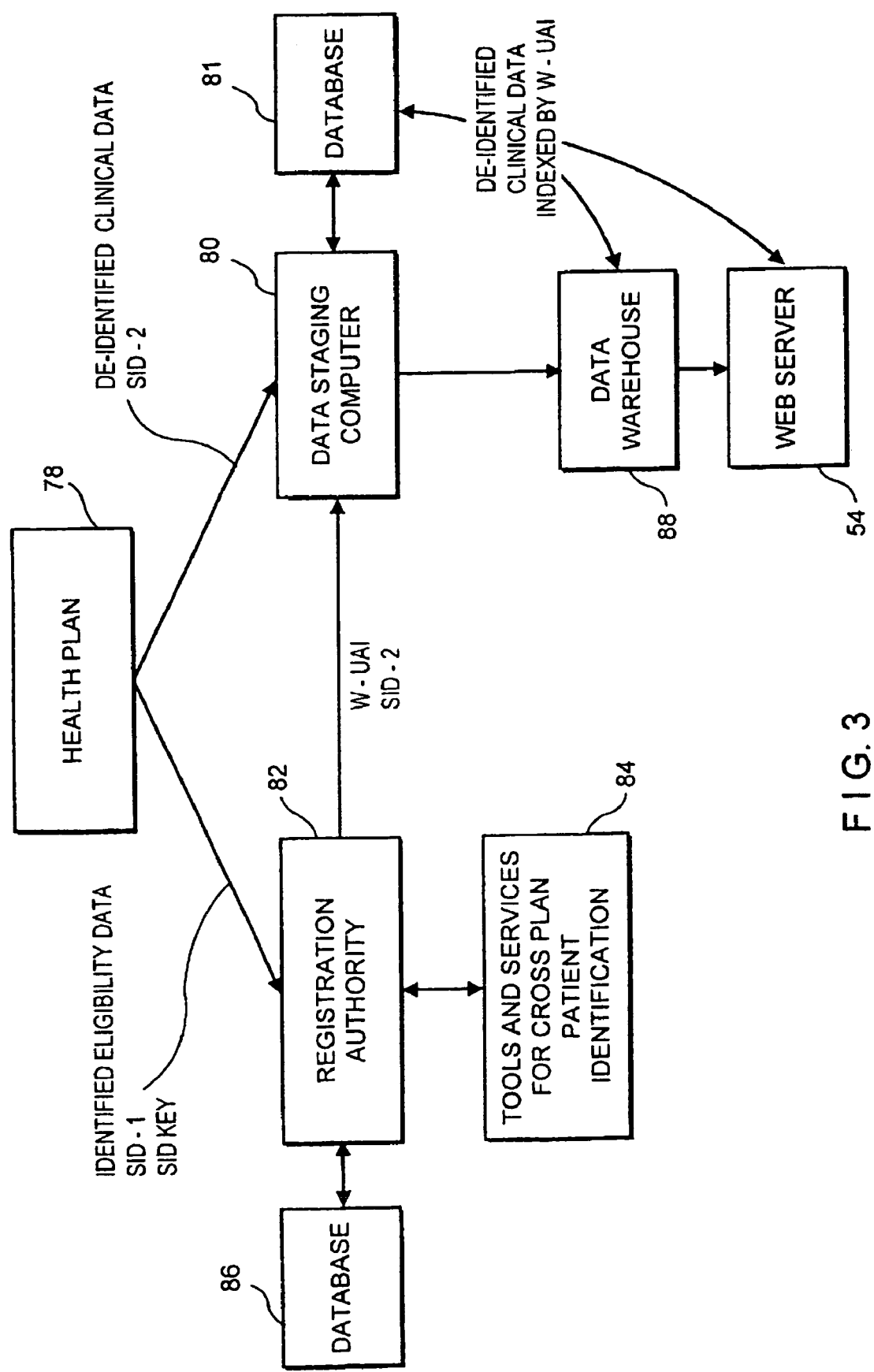
FIG. 3 is a block diagram illustrating the transfer of user data from the Health Plan to the Operator in accordance with one embodiment of the present invention.

Referring to FIG. 3, the Health Plan 78 will periodically, such as on a monthly basis, provide de-identified clinical data (i.e., medical history data) for the Users to the Operator. The de-identified clinical data for the Users may include, without limitation, ICD-9-CM, CPT-4, NDC and HCPCS J-codes, as well as other de-identified data such as birth year, sex and dates of illnesses and procedures, prescriptions, geographic information, etc. This geographic information is preferably generalized either into SCF's, the United States Postal Service central sorting locations represented by the first three zip code digits, or into the Census Bureau "Metropolitan Statistical Areas" for cities and supporting counties totaling a minimum of 50,000 individuals, and "Public Use Micro-data Areas" guaranteed to have at least 100,000 individuals or equivalent aggregate areas instead of zip code. Either method provides more than sufficient aggregation to protect de-identification. In a preferred embodiment, however, SCF's are used instead of Census Bureau areas because they are easier to compute. In either case, the Operator does not know the true identity of any of the Users. There are exceptions, however, such as where the User wishes the Operator to know its identity for legally sanctioned purposes such as personal health care management.

Referring again to FIG. 3, the Health Plan 78 maintains the clinical data and eligibility data (e.g., name, address, telephone number, age, sex, family status, financial fields, etc.) of the Users in its internal computer systems. To easily identify the Users, each User is assigned a unique surrogate ID (SID-1) by the Health Plan, which will typically be a unique alphanumeric string.

During the periodic data transfer, the Health Plan 78 will transfer to the Operator de-identified clinical data for the Users indexed by encrypted surrogate ID (SID-2). This transfer may be accomplished in any number of ways. For example, the de-identified data may be transferred via a magnetic tape or CD-ROM mailed to the Operator via U.S. mail or overnight courier. The transfer may also be carried out over the Internet or, preferably, via a high speed virtual private network (VPN) within the public Internet, such as an encrypted VPN (preferably the VPN negotiates session encryption keys of at least 160-bits). Whichever method is used, the data is received and uploaded to the Operator's data staging computer 80, where it is processed into a form suitable for use by the Operator based on criteria which may be established by the Operator.

At the same time the de-identified data is transferred to the Operator, identified eligibility data is transferred to a trusted third party called a Registration Authority using one of the methods described above. The identified eligibility data may contain, for each User, the health plan ID, the User's contact data, the unencrypted surrogate ID (SID-1), other internal and external identifying codes, demographic and house-holding data, and miscellaneous grouping and tracking codes unique to the data provider. The Registration Authority does not receive any clinical data. The Registration Authority does, however, maintain detailed identifying data, preferably enriched with third party tools and databases to support its mission of assigning only a single UAI to an individual throughout that individual's life. The Health Plan 78 also, preferably in a separate transmission, transfers an SID encryption key which enables the Registration Authority to convert SID-1 to SID-2 so that the Registration Authority can send non-identifying data such as the encrypted UAI to the Operator and the Registration can be correlated by the Operator with the de-identified medical data already provided by the Health Plan, as discussed below. In a preferred embodiment, the SID key is transferred only when it is first created and thereafter only whenever it is updated. The SID key does not have to be transmitted with every new eligibility feed.

Once the data is received by the Registration Authority and uploaded to its server 82, a unique UAI, which will typically be a unique alphanumeric string, is created and assigned to each User by the Registration Authority server 82. The UAI is preferably a cryptographically strong (i.e., 128-bit or greater) random number generated by combining rapidly and unpredictably varying system and network states using a cryptographic hash (any strong, standard cryptographic hash such as MD-5, SHA-1, or any member of the RIPE-MD family is satisfactory), and using that hash as the seed input to a cryptographic random number generator, such as JCE or equivalent. One embodiment of the present invention produces 16-byte (128-bit) binary UAIs using MD5 and JCE, but these details could be changed to any other equivalents without affecting security. The UAI is converted to 26 base-32 characters (upper case letters and numerals) for convenient storage and management, but is converted back to 16-bytes of binary for compactness and efficiency during cryptographic operations.

If a UAI had been previously assigned to a User, then that previously assigned UAI will preferably be used. Once a UAI is assigned to a User by the Registration Authority, the UAI preferably never changes. Thus, a User may easily migrate across health plans without an interruption in service since the UAI is generated by the Registration Authority and not the Health Plan. The Registration Authority server 82 also contains tools and services 84 to facilitate cross plan User identification. The identified non-clinical data received from the Health Plan is stored in the eligibility database 86 indexed by UAI.

It should be noted that while UAIs facilitate data mapping and User migration among plans, such is not required. If contractual obligations prohibit such mappings then the Registration Authority may issue new UAIs for those Users whose eligibility data cannot be migrated. If at a later time the contractual environment changes to encourage a common identity (single sign-on to diverse, multi-vendor, multi-domain web applications is a typical reason), then a simple method exists for merging identities. Standard mailing-house merge-purge tools and methodologies can be used to create a candidate list of likely matches. Those on the list can then be contacted during a subsequent logon and offered the opportunity to merge their multiple accounts into a single identity. If they agree, they are asked to authenticate into each additional account. Successful logon into each additional account provides sufficient evidence for then merging the previously disparate identities.

After the UAIs are assigned and/or correlated to the identifiable data received from the Health Plan 78, the Registration Authority server 82 will transfer to the Operator the UAI encrypted under the Registration Authority's operator key (W-UAI) and the SID-2 (encrypted SID-1) for each of the Users. This transfer may be accomplished using any of the methods discussed above, but is preferably carried out over a 160-bit VPN within the public Internet. The VPN is confidential, authenticated and high speed and therefore provides enhanced performance. After receiving the W-UAIs and SID-2s from the Registration Authority, the Operator replaces the SID-2s stored on its system with the corresponding W-UAIs.

The W-UAI is encrypted with a key, preferably using 3-DES, however any symmetric block cipher with at least a 128-bit key that also supports block chaining such as AES or 2-Fish is satisfactory. It is important that only the Registration Authority knows the key used to encrypt UAIs into W-UAIs for any given Operator. Therefore, it is also important that attackers whether internal or external face the most difficult commercially feasible obstacles to either obtaining or guessing the key. In one preferred implementation, the key is strongly random and is generated in a manner similar to that used for generating UAIs. However, unlike UAIs, the key is generated directly into a cryptographically secured, and preferably hardware protected, key store. Thus, the Operator associates personal data with an encrypted UAI (W-UAI) that it cannot decrypt, but which can be used for securely correlating personal data with an identity. This protects against (1) dishonest employees of the Operator since they do not have access to identities; (2) dishonest employees of the Registration Authority since they do not have access to personal data; (3) simple collusion of Operator and Registration Authority employees based on equivalent unique index values at both sites since UAI does not match W-UAI, and SID1 does not match SID2; and (4) hackers since they need access to the Operator and the Registration Authority facilities.

Is should be noted that re-identification of Users is still possible but requires a sophisticated attack at the Registration Authority against the cryptographic key store or the API (Application Program Interface) that invokes it in combination with an attack on the Operator's site. Re-identification without compromising the key-store or cryptographic API at the Registration Authority is impossible within the bounds of the system, though it can be achieved by such direct expedients as compromising the User's browser or ISP (Internet Service Provider) in parallel with an attack on the Operator's site. Those of ordinary skill in the art will appreciate, however, that the present invention provides a vehicle by which a User's privacy and security can be maintained during communications with a genuinely de-identified site, provided due diligence has been taken by the User and Operator in securing the rest of the online data pipeline between User and Operator.

Inter-operator collusion is prevented by the Registration Authority's maintaining different key sets for each Health Plan and each Operator. Thus a User's W-UAI at one Operator's site is different from that at any other site. This prevents sites from cooperating in determining a User's identity or indeed sharing any data about a User. Since de-identified sites do not share any common keys with each other or any identified sites, both de-identified and identified sites can co-exist under the umbrella of Registration Authority authentication services. Maintaining different UAI encryption keys at the Registration Authority for each Operator, and not sharing those keys with anyone, including not sharing them with those on whose behalf they are maintained, is a core of the privacy protection provided by the Registration Authority. Similarly, although the SID-2 encryption key is shared by the Health Plan and Registration Authority, different (preferably strongly random) SID-2 keys are generated at each Health Plan, so de-identified Operators cannot collude based on the SID-2 values they might receive from different Health Plans.

The indexed clinical data is then stored in the database 81 for reference purposes and downloaded to the Operator's data warehouse server 88. After the data is stored in the data warehouse server 88, it is uploaded to the Web server 54 via the Operator's internal computer network and stored in the User database 44 indexed by W-UAI.

Those of ordinary skill in the art will appreciate that simple collusion between a dishonest Health Plan employee and a dishonest Operator employee is not possible because the association of an identity with its personal data requires access to the SID-key, and the SID-key and the cryptographic API's that invoke it are preferably carefully protected by both the Registration Authority and internal security operations at the Health Plan.

As discussed further below, the UAIs are preferably encrypted throughout the system in order to prevent simple collusion among members of the operations staff at the various facilities. This cryptographic protection may be further enhanced procedurally by ensuring that systems with differing de-identification requirements (such as an Operator versus the Registration Authority) are housed at different facilities and operated by different companies using different operations staff. The sequence of encryptions represents the order in which data moves through the system when first loaded. An upstream service can recover the UAI it provided, but the recipient cannot determine how the UAI was represented in the provider. Since both the key store and the cryptographic APIs that invoke it are preferably secured with state of the art active and passive measures, only successful intruders or technical staff with sufficient time, opportunity, and skill to find and determine how to either crack the key store or subvert the cryptographic API, and sufficient luck or connections to avoid or subvert active measures such as manned intrusion detection monitoring, might be able to compromise the system. This should be significantly beyond the technical ability of routine operations staff. Very few individuals or organizations possess the skills and tools to attack the key store directly if the key store is secured either with cryptographic hardware, or using best-of-breed standard software cryptographic techniques acquired as part of a standard commercial cryptographic library, such as IBM's JCE key store support or equivalent. Therefore, those of ordinary skill in the art will appreciate that subverting the cryptographic API is the much more likely attack. As always, the senior technical operation staff present a security risk that must be managed by non-technical means such as incentives and penalties.

With respect to the upload to the data warehouse server 88, recent clinical data for registered Users (i.e., since the last upload) are extracted from the relevant data warehouse tables and staged for transport to the Web site 10. The extract file is uploaded (typically, but not necessarily) via FTP (File Transport Protocol) from the data warehouse server 88 to the Web site server 54. The upload is detected by the Web site server 54, which initiates the claims data intake process. The extract file is loaded into a relational staging table for further processing. During the file to staging table load, the extracted data is validated with regard to dates and content. If the data is invalid, an error is reported to the data warehouse server 88 and Web site administrators, and data intake is halted. Otherwise, data intake continues with the clinical data in the staging table, which had been organized in a unified, non-redundant manner for efficient transmission, is reorganized into multiple, somewhat redundant intake tables for efficient data access. Certain data relevant to the operational needs of the Web site is derived from the claims information and added to certain records. For example, a pregnancy flag is set for females with the appropriate claims in the past 8 months. Backup staging tables are dropped, current operational tables are made into backup tables, intake tables are made into current operational tables, and new intake and staging stables are created.

After uploading to the Web server 54, the clinical data is stored on the Web site 10 in the User database 44. The User database 44 is a table which lists each User by W-UAI and may include without limitation columns containing the User's Web ID, the User's customizations activation code, the User's ICD-9-CM, CPT-4, NDC and HCPCS J-code history, the User's content profile designations, and other de-identified information of interest to the Operator. The concept of content profiling will be discussed in detail below.

c. New User Registration

As indicated above, Users will access the Web site 10 by presenting a unique Web ID and password (or proving possession of the private key matching the public key in a digital certificate). However, to ensure that third parties do not obtain someone else's Web ID and password (or digital certificate), a robust security mechanism is preferably implemented.

This robust security mechanism is based on the following three principles: (1) no one agency contains all the keys needed to identify clinical data with a User in the real world; (2) the level of identification assurance at the Web site 10 must be at least as high as the entity which provides the data (e.g., health plans, employers); and (3) no two agencies use the same key to index a User's records (this prevents simple collusion between staffs at two different agencies).

Figure 4:
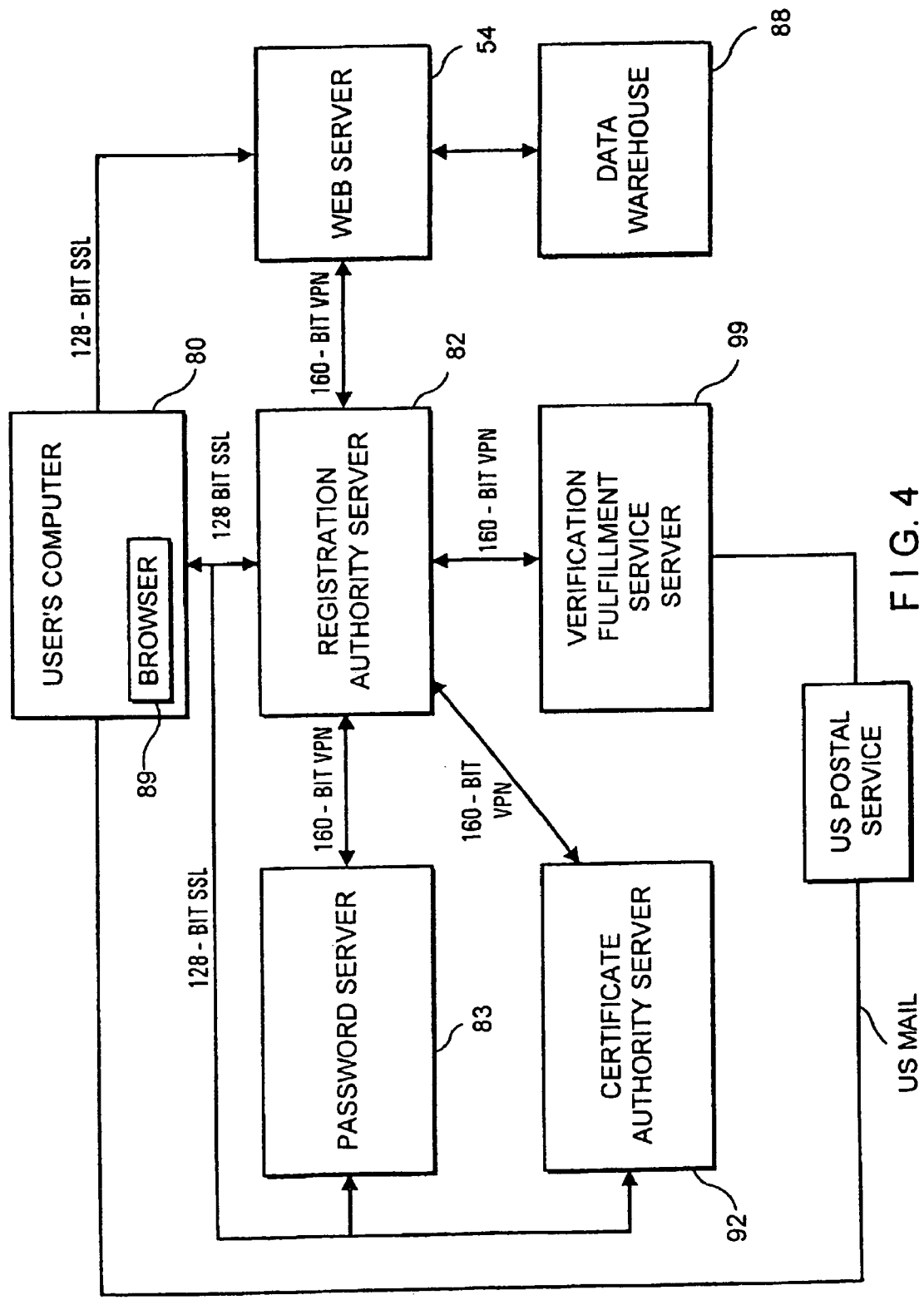
FIG. 4 is a block diagram illustrating an overall system structure in accordance with one embodiment of the present invention.
Figure 5:
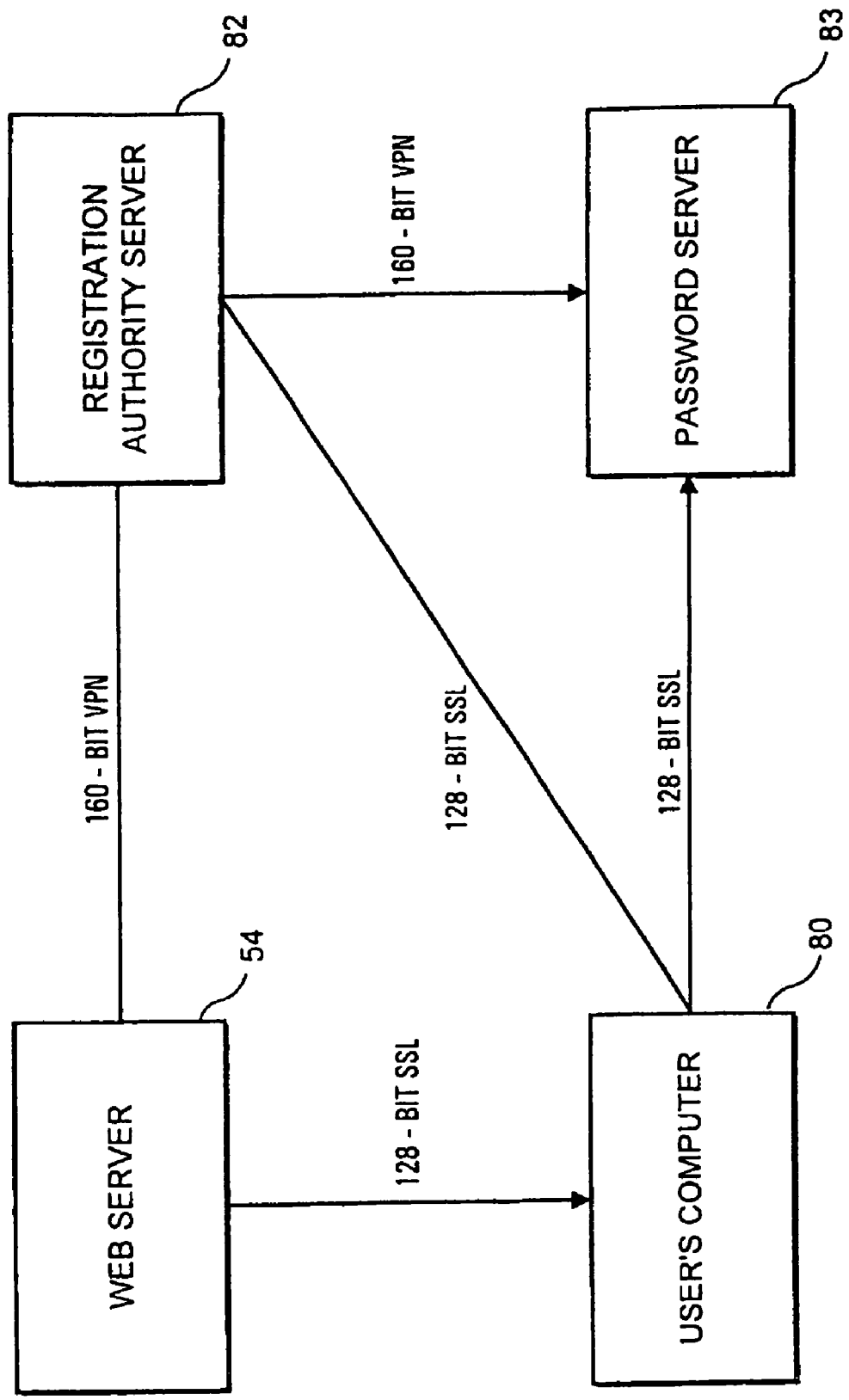
FIG. 5 is a block diagram illustrating the various communications links during new user registration via the Password server in accordance with one embodiment of the present invention.
Figure 6A:
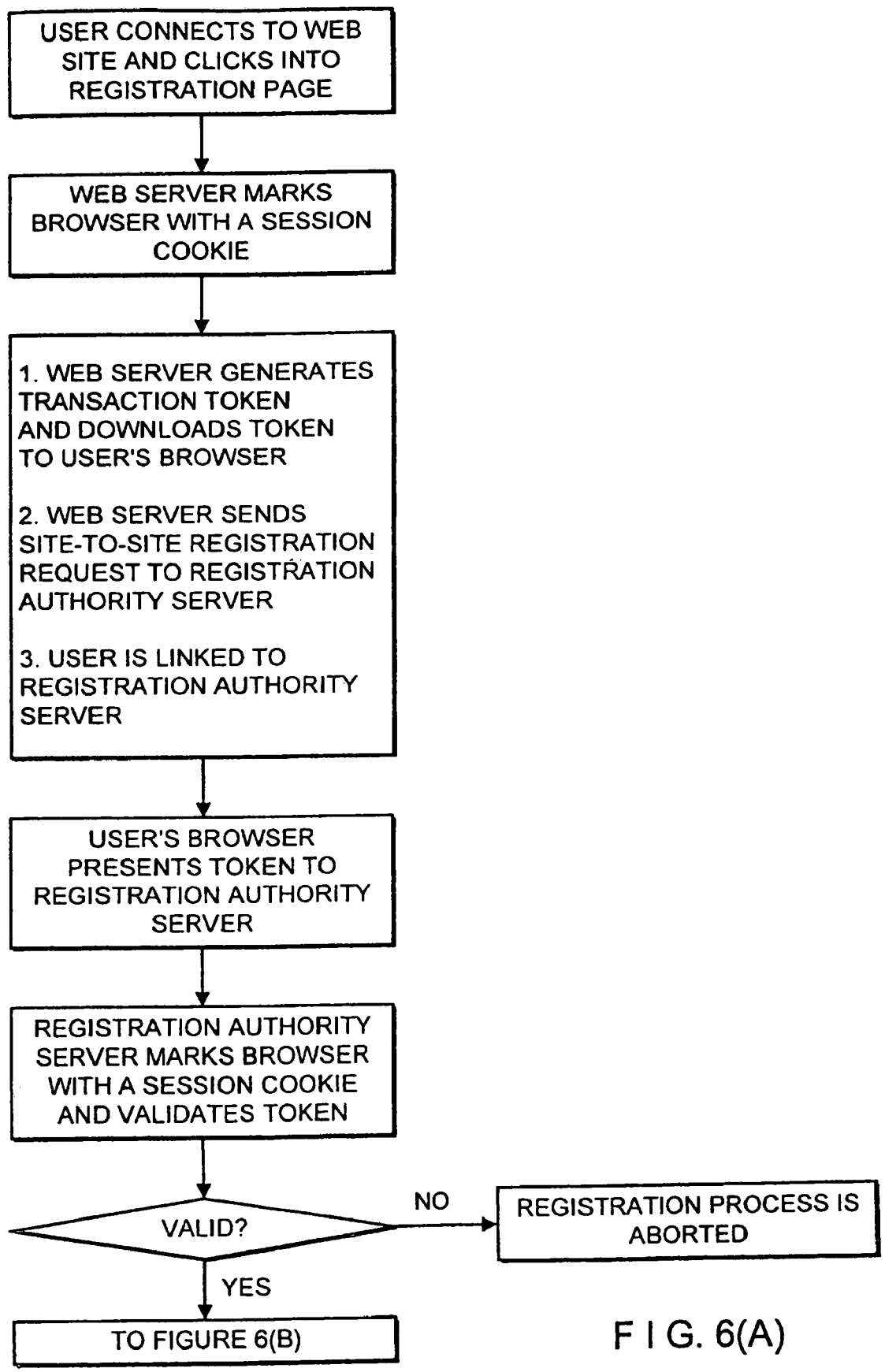
Figure 6C:
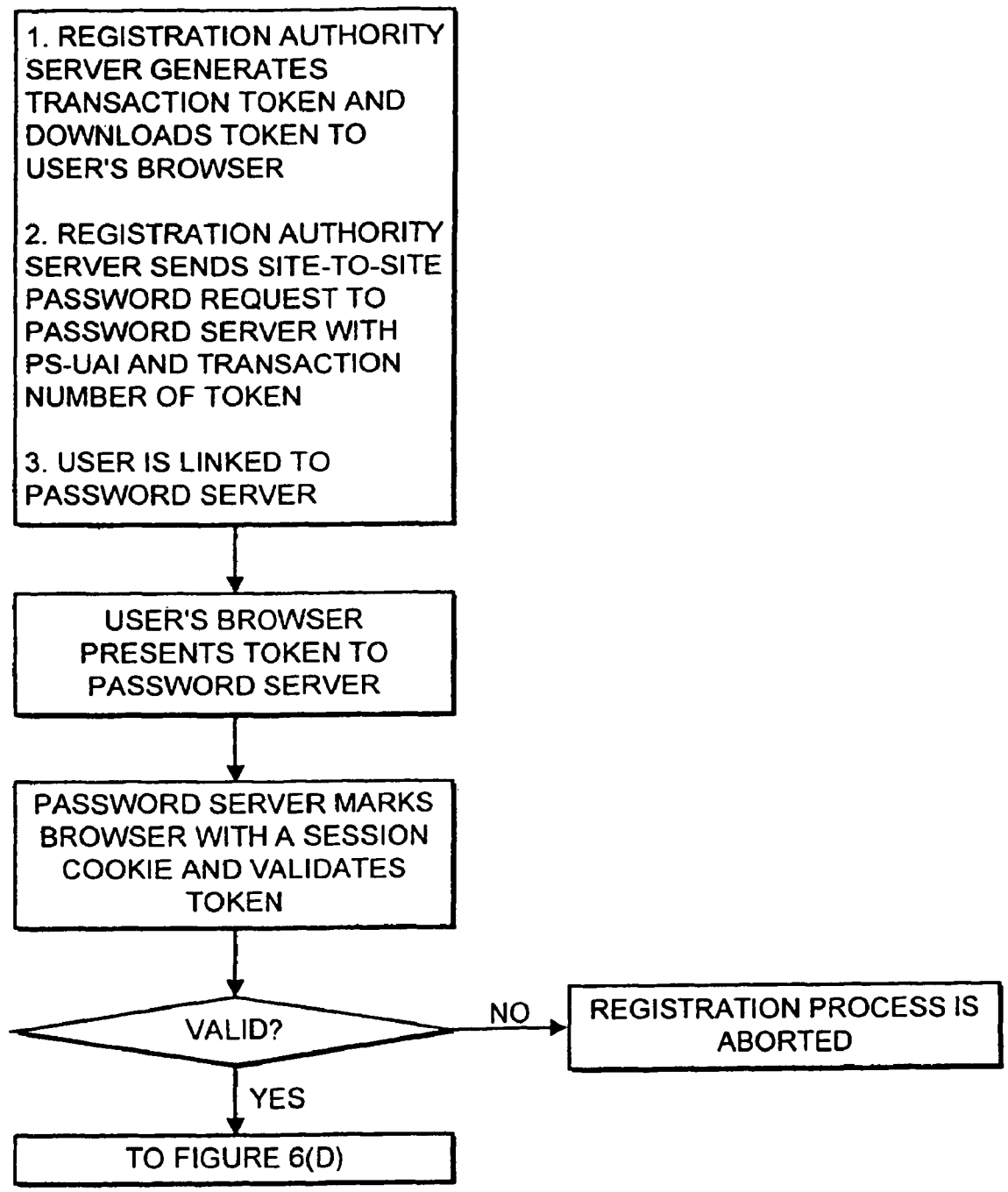
Figure 6D:
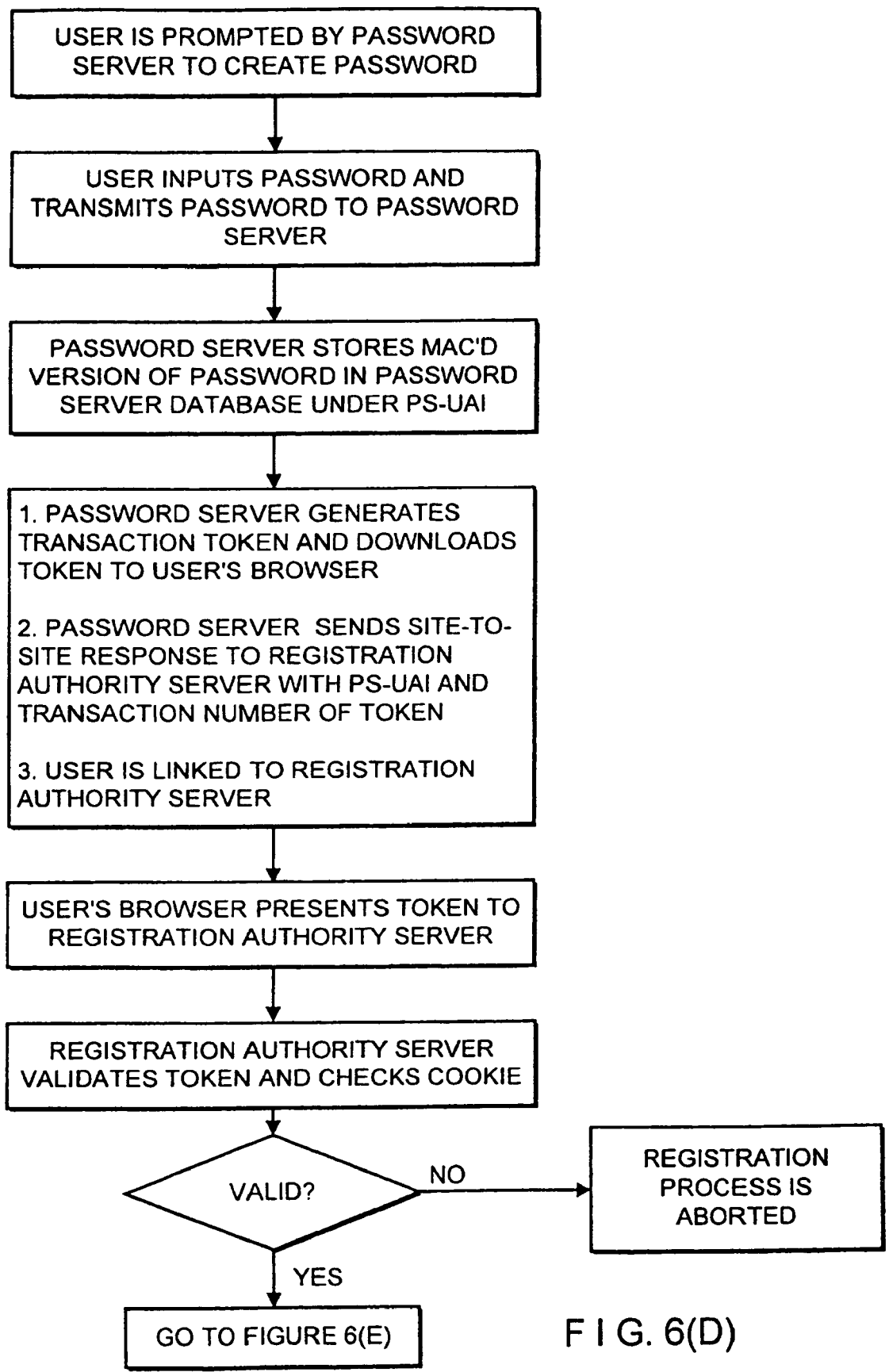
Figure 6E:
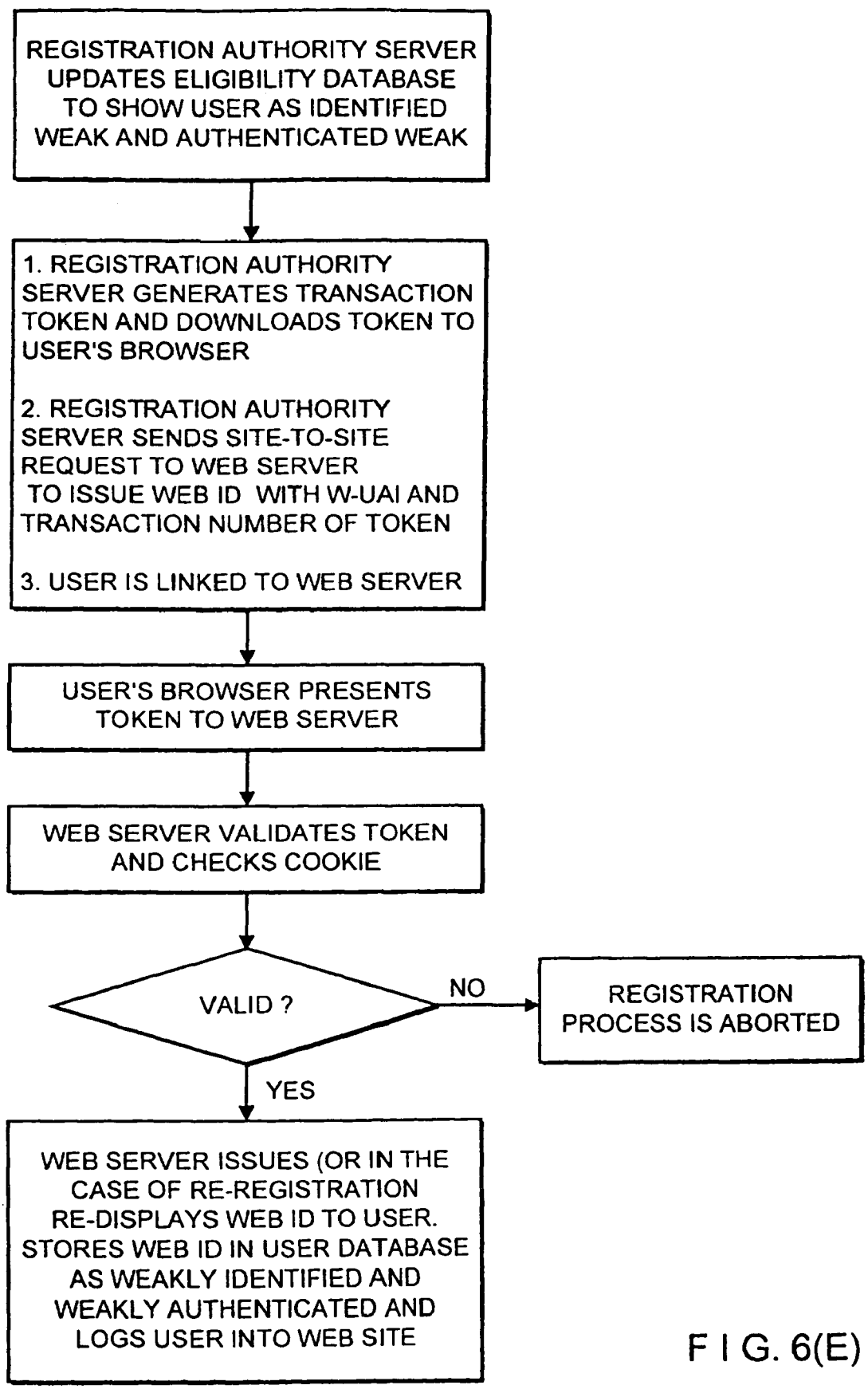

Referring to FIGS. 4 and 5, a User using the Web site 10 for the first time will connect to the Web site 10 using the Web browser 89 (preferably SSL-128 enabled) on his/her computer 90 and click into the registration page 14. The User's computer will typically be a conventional personal computer (PC) that includes a chassis that houses a central processing unit (CPU) and supporting circuitry, as well as a floppy drive, a hard drive and an internal modem. Connected to the CPU through the chassis will be a keyboard, a mouse and a monitor. The computer 90 will typically be coupled to the Internet via a telephone line connected to the modem, although the computer can be connected to the Internet via an always-on high speed data transmission line such as DSL, cable-modem, or other broad-band technology. The User will typically connect to the Internet using an Internet service provider, such as Erols™ or America OnLine™, but may have a direct connection to the Internet. Although a conventional PC will typically be used by the User, the User may use any type of computer that can be connected to the Internet, including a work station on a local area network, and any operating system.

The Operator's Web server 54 marks the User's browser with a session marker such as a session cookie and notes "pending authentication" or some similar status in the server's session database. Preferably, the session cookie will contain no actionable data but will simply hold a pointer to session information held in the Web server's database(s)—this prevents actionable data from being "hacked" out of the cookie. To avoid the potential for re-identification based on the same value being used from session to session, the pointer should be an encrypted random value, and to prevent the risk of "bit flipping" attacks and errors, the MAC (Message Authentication Code) of the encrypted pointer should also be held in the cookie if the pointer is under 128-bits. If a MAC is used, the pointer should be validated against its MAC whenever the cookie is consulted. The pointer value is encrypted in the cookie to prevent an attacker who has targeted an individual User, corrupted the User's browser or ISP, and also successfully invaded the cookie issuing site from finding the User's data on the server using the value in the cookie. A successful attack on the key store or cryptographic API would let such an attacker find the User's data by decrypting the pointer, but such an attack is far harder than the obstacles most hackers know how to overcome. Note that in the situation where the User has a pre-mailed Web ID and has presented the pre-mailed Web ID to the Web server 54, the W-UAI of the User will be in the Web server's session tables even before the Registration Authority has authenticated the User. That is why it is important that a User's status as he/she progress towards logon be recorded in the Web server's session tables. Relying on a cookie or the presence of a W-UAI alone is insufficient evidence that the User has successfully presented all required logon credentials.

As those of ordinary skill in the art know, a MAC is a standard cryptographic technique that either hashes a message's contents along with a secret "salt" key not otherwise present in the message, or hashes the message's content and then encrypts the hash using the secret key. In either case, the key is a secret, preferably strongly random (128-bit or higher), value known to at most two parties—the sender and the receiver. If the sender wants to prove to itself at a later time that a message was generated by it at an earlier time and has come through untampered, then only the sender will know the key. A MAC key is never known by three or more parties since then a receiver cannot tell who the sender was just by examining its own records to see if it was the originator of the MAC (if it didn't originate the MAC, then the other party must have).

The Web Server will then perform three simultaneous or nearly simultaneous functions. First, it will generate a transaction token preferably comprised of the 3-DES encryption of (1) a time stamp, (2) an encrypted unique strongly random transaction number, (3) a code for the service being requested (e.g., registration), and (4) a MAC of the message, and download the token to the User's browser preferably using 128-bit SSL encryption. In cases where the token is being issued as part of returning the User to a site that had previously requested a service for the User, the transaction number of the requesting transaction is also included in both the token and the related site-to-site VPN message. The requesting transaction number is included in both message streams to permit the requesting site to create threads or processes that block pending a response to a request transaction. The value that unblocks the thread or process is simply the decryption of the requesting transaction number, and placing it in both the token and the VPN message ensures the unblocking will occur regardless of which message path delivers first, and even if one message path is blocked. In a preferred embodiment, either the transaction number or the MAC go first in the token, the requesting transaction number if any goes next, and the time stamp and service code last, so that an attacker must decrypt most of the token before being able to tell if the decryption attempt was a success. Those of ordinary skill in the art will appreciate that the composition of the token may vary from Operator to Operator as required and that the present invention is not limited to the specific type of token described herein.

Second, the Web server 54 will send a site to site request, preferably via 160-bit VPN, but at the least by client-side SSL (requiring that both the Web server 54 and Registration Authority server 82 have SSL certificates that are known by both parties), to the Registration Authority server 82 requesting that the User be registered, specifying any special handling or conditions, and providing the transaction number of the User's token. As a security precaution, the token is provided with a finite life, such as sixty seconds. If the token is not presented within its lifetime, it is automatically rejected. And third, the Web server 54 will hyperlink the User to the Registration Authority server 82.

In a preferred embodiment, the transaction number is encrypted under a key known to the sender but not the receiver before entering the token to prevent it from becoming a shared unique index between the sites and thereby opening the opportunity for simple collusion. For similar reasons the time stamp is coarsely grained (e.g., 10ths of a minute) so that it cannot be uniquely identifying, and both the time stamp and MAC are generated within the cryptographic API at the moment the token is created and are values unknown to the creating site (since they are not returned by the cryptographic API).

Unfortunately, the token as a whole is a value potentially available to both the sender and receiver and therefore is a potential topic for simple collusion. This collusion possibility is similar to the threat posed by IP packet headers on the VPN traffic, and is unavoidable when communicating between sites using a medium that does not have a privacy protecting protocol. The opportunity for collusion can be prevented procedurally by enforcing that a token not be stored in any data-structure involved in application logic, and that any datastructure in which a token is stored be short term only (i.e., no logs or backups). So long as active security monitoring prevents administrators or attackers from providing a mechanism by which tokens can be correlated with application data, the ability to match tokens between sites will not pose a re-identification threat. This is because tokens are used only once, and the User indices within the token cannot be discovered without decrypting the token, which is an application level activity. At such time as NymIP or other privacy protecting transport protocol becomes available, it may be incorporated into the site to site communications channel to prevent IP header based collusion attempts using the VPN traffic. Preventing whole token based collusion attempts will require ongoing diligently enforced separation of communications services and application services.

If no site to site communication channel is available, then any information that would otherwise be sent directly site to site can be added to the end of the token. It should, however be apparent that using site to site communication where available both speeds the process by putting the majority of the messaging burden on the high-speed and scalable capacity available to a corporate web site, and secures the process by requiring that an attacker compromise both the token and the VPN in the short time window before a token expires.

After the User is hyperlinked to the Registration Authority server 82, the User's browser 89 automatically presents the token (preferably posted in a hidden field) to the Registration Authority server 82. The Registration Authority server 82 then marks the User's browser 89 with a session cookie and decrypts and validates the token by first checking the time stamp for expiration, and if the token is not stale then (1) checking whether the transaction number has already been submitted (this prevents "replay" attacks), (2) checking the service code against services permitted to the User at the moment (this prevents an attacker from "jumping" over a step), and (3) checking all of the message except the MAC against the MAC (this prevents "bit flipping" attacks).

Assuming the token is valid, the Registration Authority server 82 first asks the User to select his/her health plan (or employer) since the Registration Authority may be servicing more than one health plan/employer. The Registration Authority server 82 then asks the User a series of questions which, if answered correctly, will weakly identify the User. These questions should at least and will typically include the last four digits of the User's social security number, the User's last name, the User's date of birth, the User's gender and the User's first name. Additional questions may include the User's group number, the User's entire social security number, and the User's relationship to the subscriber (in the case of a family member). The answers provided by the User are preferably transmitted over a connection encrypted using SSL-128 to prevent the answers being intercepted by a hacker while in transit.

It should be noted that the quality of identification provided by answering questions is considered "weak" since a competent private investigator or certain of the User's intimates could have answered the questions correctly. This identification quality is preferably recorded at the Registration Authority and transmitted to any Operator that requests a registration or logon involving that User. A means to upgrade the identification quality to "strong" through use of a single code sent by out of band communication (e.g., mail or phone) is discussed below.

If the answers provided by the User match an identity based on the eligibility data in the Registration Authority serber's 82 eligibility database 86, the Registration Authority server 82 obtains the UAI for the User, encrypts the UAI using the Operator key to obtain W-UAI and passes W-UAI to the Web server 54 to inquire whether a Web ID already exists for the User. If a Web ID already exists, the User is offered the opportunity to have the Web ID e-mailed to the account on record. If the User accepts, the Web ID is sent and the registration process is aborted. If the User declines, the Web server 54 is informed that a re-registration is occurring, and that the User should be considered weakly identified, regardless of the User's former status. The previous Web ID will be re-displayed to the User by the Web server 54 on completion, and none of the User's records will be lost, but some records may be inaccesible to the User until strong identification is (re) established via the vCode process described below.

If a Web ID does not exist for the User, the Registration Authority server 82 generates a transaction token and downloads it to the User's browser, hyperlinks the User to a Password server 83, which may be either part of or separate from the Registration Authority server 82, and sends a site to site request over a high speed VPN to the Password server 83 requesting the Password server 83 to issue a password to the User. Accompanying the request are the User's UAI encrypted under the Registration Authority server's password server key (PS-UAI) and the transaction's token number. If the Password server 83 is operated by and at the Registration Authority, then there is no need for token processing or site to site communication, and the PS-UAI can be the same as the UAI. The transfer can simply be between web-servers masked behind the site's external IP address. An external password service might be used to provide scalability for logon support without scaling up the rest of the Registration Authority. An external password service is an optional component of the architecture.

The Password server 83 then marks the User's browser 83 with a session cookie and validates the token. If the User provides a valid transaction token to the Password server 83 during the life (i.e., validity period) of the token, the User is asked to create a log-on password. Preferably, the User is first advised of the Registration's Authority's password policy and the password must comply with that policy. Assuming the password does satisfy the policy, preferably the MAC of the password is stored in the Password server's password database indexed under the PS-UAI. Optionally, the User can provide password hints and e-mail addresses that allow the password hint to be sent to those e-mail addresses upon authorized request.

In accordance with standard cryptographic best practices, the password MAC's key is preferably derived from an index unique to the User, for example either the UAI or a function of the UAI, combined with a secret key used for all passwords. Using a MAC key that changes from User to User prevents an attacker from identifying passwords that match each other and having to crack only one of the set to crack all, while using a protected secret key as part of the salt prevents an attacker with access to the UAIs from pre-compiling all likely password MACs offline using a dictionary, a list of UAIs, and an illicit copy of the Registration Authority's cryptographic library.

After the User's password (or its MAC) is stored in the Password server's database, the Password server 83 hyper-links the User to the Registration Authority server 82 after providing the User with a transaction token and sending the transaction response and token transaction number to the Registration Authority server 82 along with the PS-UAI. If, on the other hand, the User did not receive a password, the Password server 83 notifies the Registration Authority server 82 that the User did not receive a password and the Registration Authority server 82 updates the identification field in the eligibility database associated with the User's UAI to show that registration was not completed successfully.

Assuming the User has received a password, the Registration Authority server 82, after validating the token and decrypting PS-UAI and checking the resulting UAI against the UAI in the session record pointed to by decrypting the session cookie, updates the identification field in the eligibility database associated with the User's UAI to indicate that the User has been weakly identified and weakly authenticated and so notifies the Web server 54, generates and downloads a transaction token to the User's browser 89, hyperlinks the User to the Web server 54, and issues a site to site request to issue a Web ID accompanied by the W-UAI. After validating the User's token and either, in the case of pre-mailed Web IDs, verifying that the W-UAI returned by the Registration Authority server 54 matches the W-UAI recorded in the server's session data as pointed to by decrypting the session cookie or, in the case of a new registration, verifying that the token decrypts to match the transaction number of the of the Web server's original registration request as recorded in the server's session data as pointed to by decrypting the session cookie, the Web server 54 issues the User a Web ID if one was not pre-mailed and logs the User onto the Web site. The Web ID is a unique ID created by the Web server 54. Since the Registration Authority does not know the User's Web ID, the User is protected against dishonest administrators or successful crackers at the Registration Authority gaining access to their personal medical data by illicitly attempting to logon as the User. The Web ID is stored in the User database 44 indexed under the W-UAI.

The basic steps involved in a registration via the Password server 83 are summarized in FIGS. 6(a)-6(e).

If desired, the User can be sent directly from the Password server 83 back to the Operator's Web server 54 without having to re-appear at the Registration Authority server 82 if the Password server 83 requests the correct URL from the Registration Authority who either has it cached or requests it from the Operator. Preventing time consuming end-user redirects by using direct site to site communications on the User's behalf is part of the power of the two channel (i.e., direct site to site communication plus token to securely match the User to the communications) method described herein.

Figure 7:
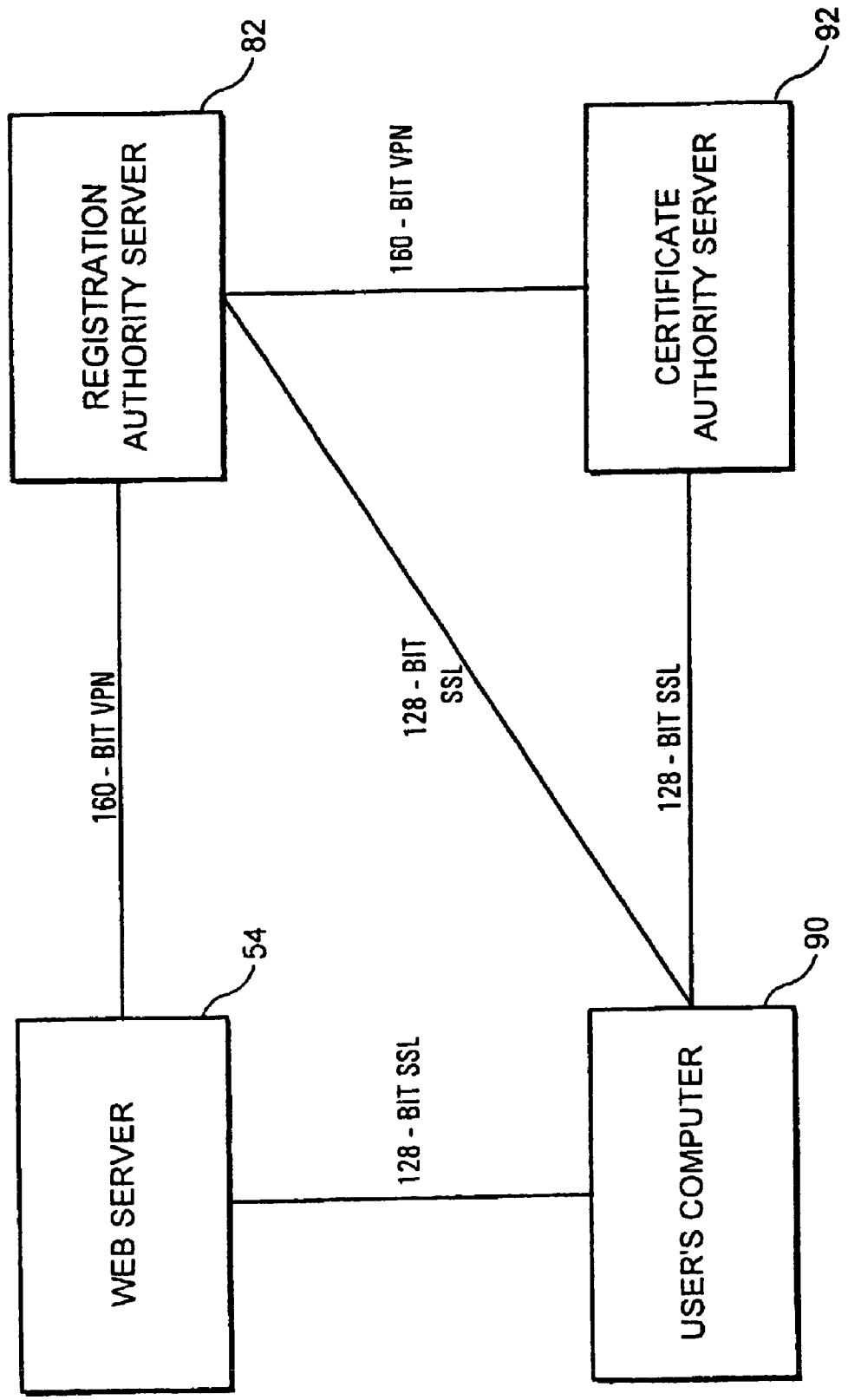
FIG. 7 is a block diagram summarizing the various communications links during new user registration via the Certificate Authority server in accordance with one embodiment of the present invention.

If desired by the Health Plan, Users may also be given the option to use digital certificates issued by a Certificate Authority for authentication instead of passwords. Referring to FIGS. 4 and 7, after selecting the registration icon at the Web server 54, the User is hyperlinked to the Registration Authority server 82 where questions are asked of the User, as discussed above. Assuming the questions are answered correctly and based upon the preference of the Health Plan, the User is hyperlinked to a Certificate Authority server 92, (such as Entrust/Auto RA) along with the CA-UAI and presents a token generated by the Registration Authority server 82. The Registration Authority server 82 also sends a site to site request via VPN to the Certificate Authority server 92 containing the UAI encrypted under the Registration Authority server's certificate authority key for the Certificate Authority server 92 (CA-UAI).

Assuming the User presents the valid token within the token life to the Certificate Authority server 92, custom code implemented at the Certificate Authority server preferably modifies the Certificate Authority's standard enrollment (i.e, profile creation and certificate issuance) process to bypass any User interaction requiring the submission of an identifier such as a web ID or the answering of identifying questions. Instead, the User's identity is proven to the Certificate Authority server 92 by custom processing based on validating the token and using the CA-UAI that was provided site-to-site by the Registration Authority server 82 as an index to a pre-populated database of authorized candidates. From the User's point of view, the Certificate Authority server 92 immediately engages the User in dialogue around the establishment of shared secret(s) such as hint plus password or pass-phrase, the construction of personal entropy questions and answers, and/or the detection and logging of biometrics such as typing mannerisms or voice prints. On successful establishment of the shared secret(s), the User's profile and certificate(s) are issued by the Certificate Authority server 92, the public certificate is published in the PKI's directory, the User is informed of success, the User is either returned to the Registration Authority server 82 as successfully enrolled (site-to-site communications and transactions tokens are preferably used as discussed above) or returned all the way to the Operator's site (per the discussion in password issuance), and the Registration Authority upgrades the User's logged authentication quality to "strong". It should be noted that in some PKI's the User cannot leave the Certificate Authority without logging-in using the newly established shared secret(s), and only after re-submitting the shared secret(s) will the User be returned to the Registration Authority server 82 (or the Web server 54) after this additional authentication check.

Those of ordinary skill in the art will understand that the present invention is not limited to authentication via password or digital certificate as described above. For example, other password and digital certificate technologies may be implemented without departing from the scope of the present invention, as well as other authentication methods, such as methods based on cryptographic hardware in the possession of the User (for example, a "smart card").

New Users who cannot be registered online via the foregoing processes will preferably be referred to a support desk or their medical plan by telephone or secure e-mail. Users passing this supplemental authentication will preferably receive a single use Web ID and password by encrypted e-mail or US Postal Service, which will let them access the Web site and create standard Web IDs and passwords.

Those of ordinary skill in the art will also appreciate that the use of a high speed VPN for site to site transactions and the minimal interaction of the User in the registration process results in a relatively high speed transaction since the functions carried out by the slowest machine, the User's computer, are minimized. Instead, the burden is placed on the site to site interactions which are carried out via high speed VPN, thus significantly decreasing the overall transaction times.

Figure 8:
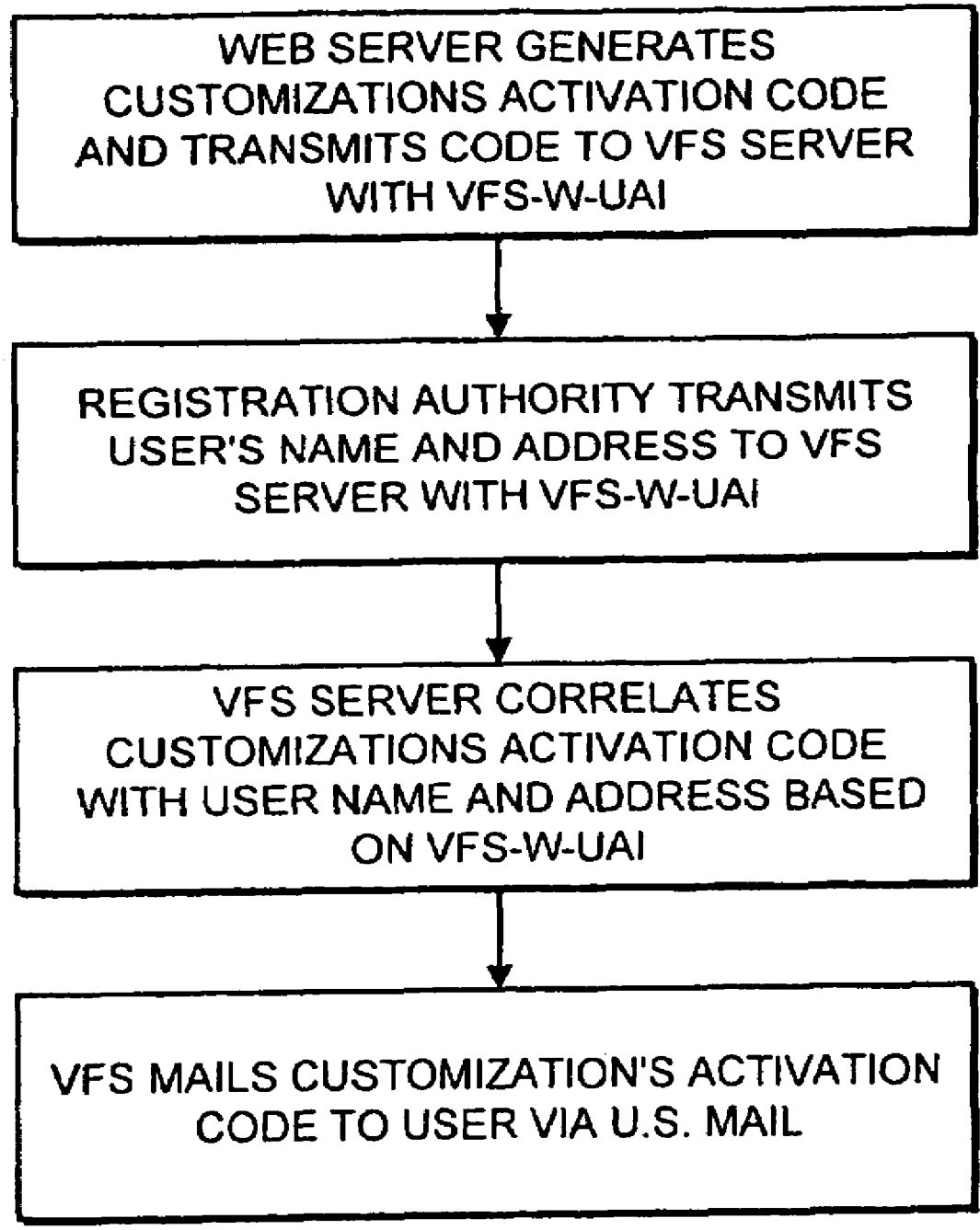
FIG. 8 is a chart summarizing the steps in providing a registered user with a customizations activation code in accordance with one embodiment of the present invention.

Assuming that a User is registered, the User may log on to the Web site 10, as discussed in greater detail below. When the User logs on to the Web site 10, the User may select customized services, which are discussed in greater detail below. However, for security, a User preferably may not access customized services unless he/she has a valid customizations activation code. Referring to FIGS. 4 and 8, a registered User will be provided with a customizations activation code which will allow the User to obtain customized services. The customizations activation code (also called verification code or "vCode") is generated by the Web server 54 and transmitted to a Verification Fulfillment Service (VFS) server 99 via 160-bit VPN, along with the W-UAI encrypted under the VFS key maintained by the Web server 54 (VFS-W-UAI), and preferably a MAC of the User's name and address as supplied by the Health Plan to the Registration Authority. If a MAC is included, then only the Health Plan and the VFS possess the MAC key. The User's name and address MACs are encrypted under a key known only to the Health Plan and the Operator and included with the medical records coming from the Health Plan to the Operator and is associated with SID-2. Including the MAC does not threaten privacy, since MACing is a one-way operation which does not let the name and address be recovered from the MAC. The MAC is decrypted just before being transmitted to the VFS. Since the decrypted MAC is not stored anywhere at the Operator's site, it cannot be used as a basis for collusion between the Operator's staff and the VFS'. The VFS is a trusted party that is preferably independent of both the Operator and the Health Plan for security reasons.

Simultaneously or nearly simultaneously with the Operator's transmission to the VFS, the Registration Authority Server 82 encrypts the UAI first under the Operator key (creating the W-UAI) and then under the VFS key to arrive at the VFS-W-UAI and transmits the VFS-W-UAI and the User's name and address to the VFS server. The VFS server then matches the VFS-UAI received from the Web server 54 and the Registration Authority server 82. If a name and address MAC is being supplied by the Operator, then the name and address supplied by the Registration Authority is validated against the MAC. To support this validation, the format and contents of the name and address sent to the VFS from the Registration Authority must exactly match those supplied to the Registration Authority by the Health Plan, and the Health Plan must have created the MAC based on the same name and address format and contents it transmits to the Registration Authority. Validating the name and address against the MAC prevents a corrupted Registration Authority from supplying the VFS with an incorrect name and address and thereby intercepting the vCode. Once a match is made, the verification code is mailed to the User via U.S. mail. This mailing will not contain the User's Web ID or password, in case it is intercepted by a third party. Once the User receives the code, he/she may use the code to receive customized services on the Web site 10, as discussed below.

Upon submittal of a valid customizations activation code, the Web server 54 informs the Registration Authority server 82 that the User has been strongly identified. If the User is eligible for a digital certificate, then the Web server 54 will be so informed and will preferably offer the User an opportunity to visit the Registration Authority server 82 and acquire a certificate as discussed above. In any case, each time thereafter when an eligible strongly identified User interacts with the Registration Authority server 82 (e.g., during logon), the opportunity will preferably also be offered. Submitting the vCode is considered a strongly identifying event since, as those of ordinary skill in the art will appreciate, the only party who has access to both the identity of a User and the User's vCode is the User.

Those of ordinary skill in the art will also appreciate that the vCode process described above is not an essential for strong authentication. Any secure, out of band communications process that places a secret, non-identifying, preferably single-use key known only to the Operator in the hands of User is sufficient for the User to become strongly identified to the Operator. It should be noted that strong identification via a secret anonymous code must be made to the Operator and not the Registration Authority since the Operator is responsible for identification (on the Health Plan's authority and behalf) while the Registration Authority is responsible only for authentication. Permitting a de-identified site to take responsibility for strong identification is one of the unique capabilities of the encrypted UAI based de-identification process described in this invention.

In addition to the foregoing registration processes, other registration processes may be implemented as well. For example, in the case of Users who are not associated with any health plan or employer yet nonetheless desire to be able to access the Web site 10 and obtain information (walk-ins), the registration process may be identical to the process described above, except that their identities are not validated. These Users, of course, will not be able to obtain customized services.

Or, optionally the User may be asked the standard questions and have them validated against a third party database such as Atlas or Gemini. The advantage of the latter method is that it permits comparison to existing or future accounts and, where appropriate, the offer of an opportunity to merge identities with matching contact data upon proof of the ability to logon to all accounts. The Registration Authority server 82 does not need to assign special UAIs for these Users since at 128-bits, the UAI name space has room for a trillion-trillion-trillion unique UAIs and the chance of assigning the same UAI twice is statistically nil. The identification field in eligibility database 86 indicates either that these Users' identities were not validated or that they were validated against a third party database. In either case, such Users are ineligible for vCode processing (and thereby are ineligible for digital certificates in any scenario other than one in which an Operator has accepted the expense and risk of issuing a digital certificate to a weakly identified User) since the Registration Authority would be imprudently exceeding its providence if it considered a User to be strongly identified without a major institutional Operator to attest to the User's identity.

Additionally, a registration process may be implemented wherein Users who are members of Health Plans (employers) can register for non-customized services using a Web ID which is generated by the Health Plan and mailed to the User. This Web ID is included with the data transfer to the Operator and is associated with SID-2 so that the Web server 54 assimilates the Web ID into the User database 44. When a User with a mailed Web ID attempts to register and submits its valid Web ID, the Web server 54 detects that this User has a mailed Web ID and issues the Registration Authority server 82 a request for a streamlined identity check. Most of the identifying questions can be dropped for Users with pre-provided Web IDs since unlike other types of registration, the Web ID and W-UAI are already known to the Web server 54. The User answers questions that the Registration Authority server 82 asks about his/her identity and the matching identity in the eligibility database is sent to the Password server 83 (PS-UAI). The User then creates a password which is stored in the Password server database.

Pre-provided Web IDs are an out of band communication, and provide better quality identification than simply answering questions at the Registration Authority. However, since such Web IDs tend to be mass mailed in eye catching envelopes, they present too much of an opportunity for simple curbside mail theft, and verification code processing should continue to be required for strong identification. If in the event that an Operator pre-provides Web IDs in a secure manner, then the quality of identification upon registration would be strong, and no verification code processing would be required.

d. Login Procedure

Figure 9:
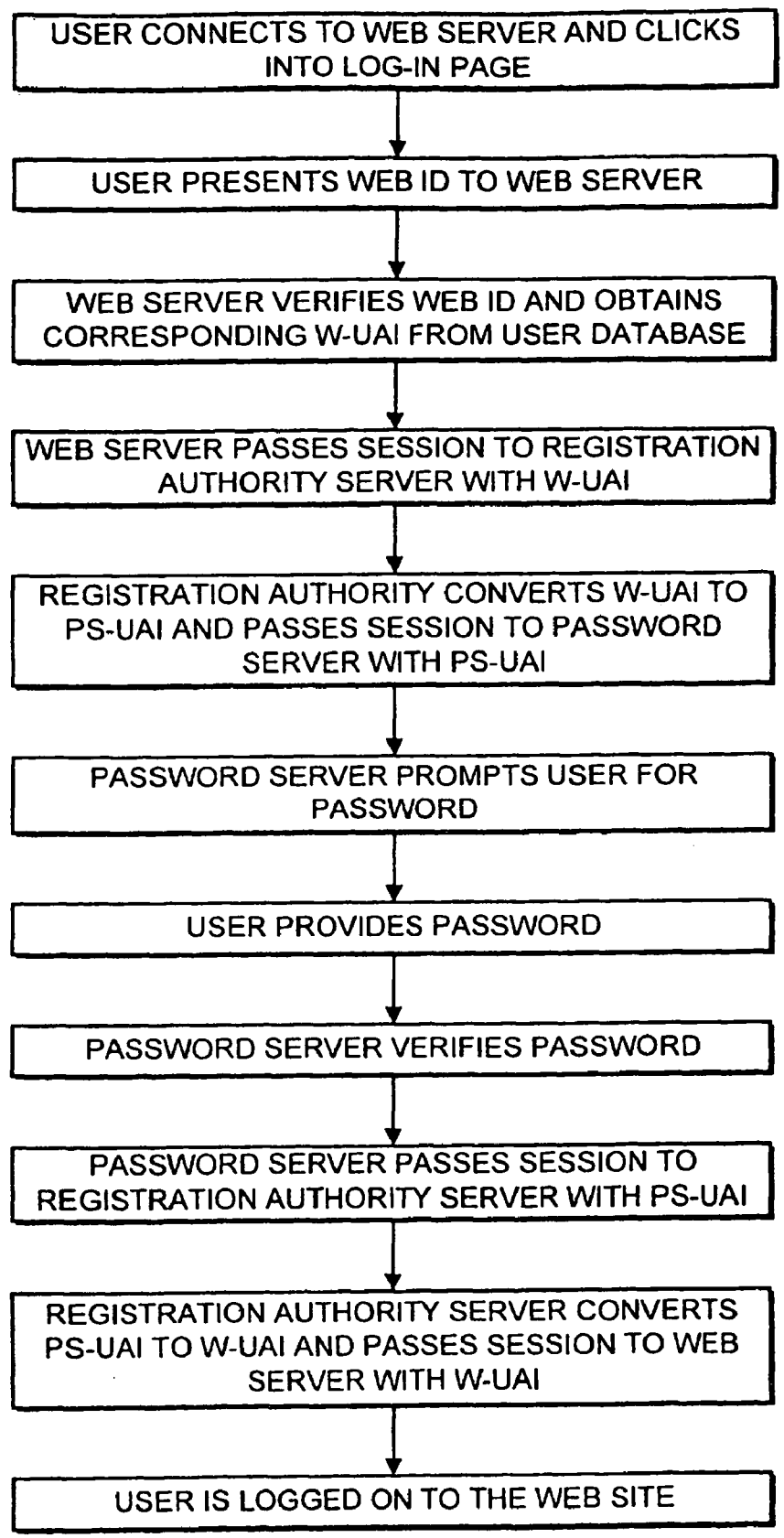
FIG. 9 is a chart summarizing the steps in a log-in via the Password server in accordance with one embodiment of the present invention.

Once a User is registered, he/she is free to log on to the Web site 10 and access the information contained therein. Referring to FIG. 9, if the User has a password (rather than a certificate), the User will first present his/her Web ID to the Web server 54. The Web server 54 will then check the User database 44 to verify that the Web ID is correct and to obtain the corresponding W-UAI. The Web server 54 then passes the session to the Registration Authority server 82 along with a request to authenticate the User under the identity associated with that W-UAI. The Registration Authority server 82 then converts the W-UAI to the UAI, looks up the authentication method, and if the method is "password", converts the UAI to the PS-UAI and passes the session to the Password server 83 (if the method is "digital certificate" the User is passed to the appropriate Certificate Authority). The Password server 83 then prompts the User for his/her password, which is transmitted over the Internet, preferably using SSL 128 encryption. The Password server 83 then authenticates the password by checking the MAC of the password against its database to determine if it is the password associated with the PS-UAI. If the User has forgotten his/her password, he/she may optionally have a password hint e-mailed. Once the password is authenticated, the Password server 83 passes the session to the Registration Authority server 82 along with the PS-UAI and an indication of whether the password is correct. The Registration Authority server 82 then converts the PS-UAI to the UAI and then to the W-UAI and passes the session to the Web server 54. If the password is correct, the User is logged on to the Web site 10. As above, site to site communications are preferably carried out over high speed VPN and transaction tokens are used for added security.

If the User has a certificate instead of a password, the User is passed to the Certificate Authority server 92 instead of the Password Server 83 and log-in will proceed in accordance with the certificate-type implemented by the Certificate Authority server 92.

Those of ordinary skill in the art will appreciate that the present invention is not limited to the log-in procedures described above. Rather, any log-in procedure consistent with the privacy and security requirements of the present invention may be used without departing from the scope of the present invention.

It should also be noted that for ease of discussion, the Web server 54 is used as the login server. In practice, however, as those of ordinary skill in the art will appreciate, a separate login server may be used so that the Web server 54 is not unnecessarily tied up resulting in slow service to the Users.

e. Portals

Referring to FIG. 14, in some situations, the Web site 10 may actually be a Web portal 500, i.e., a Web site that provides a variety of services to Users via a collection of independently owned and operated client Web sites, all of which are organized for stream lined location and navigation by the portal 500. In that situation, the challenge is how to provide Users, via a single-log on, with the authorization necessary to use the portal 500 and the client sites 502 and how to communicate that authorization to the client sites 502 without violating the de-identification requirements described above.

There are two general solutions to this problem. The first solution is to require Users to access the client sites 502 only by clicking on specific links referred to as "facilitating links" within the portal 500 due to the active code that facilitates the transit of a clicking User from the page where the User clicked to the destination listed on the link, as opposed to typing a URL of the client site in the browser, clicking on a non-facilitating link, or using a bookmark. In accordance with this solution, the User will log-in to the Web portal 500 via the Registration Authority server 82 as discussed above. Once the User is logged in, the Web portal 500 will handle all authorizations to any client sites 502 that the User browses via the facilitating links. The Web portal 500 can accomplish this by creating its own UAIs for authorizations within the portal 500 and managing cryptographic variants of these UAIs as described above for authenticating the User to the client sites 502. In other words, from the point of view of the client sites 502 the portal itself acts as a Registration Authority. Thus, for example, each client site 502 receives SID-W-UAI mappings from the portal 500 instead of the Registration Authority. The Registration Authority only becomes involved during registration from the portal and initial log on to the portal at the start of a User's session and communicates only with the Web portal 500 and not the portal's clients 502.

In accordance with this first solution, the portal 500 creates and maintains a UAI for each User and a cryptographic key for each client 502. Each client 502 in turn maintains a W-UAI for each User as encrypted under the key maintained for that client site by the portal 500 (note that the UAI encryption key is unknown to the client site). In one preferred implementation, communications between each client site 502 and the portal 500 is server to server via a PCP (Portal Client Proxy). When a User clicks on a facilitating link within the portal 500, the referring site requests a referral transaction from its PCP by passing the client W-UAI to the PCP. In response, the PCP returns a single-use referral ID (RID) to the referring site. The User is then redirected to the destination site with the RID as a post, and the RID and W-UAI are sent to the portal 500 for W-UAI translation and are then forwarded to the destination site's PCP. If the RIDs match, the User is authorized. Preferably all values communicated travel by token or, better still, by site-to-site VPN with only the transaction number travelling on the User's browser via token.

Care should be taken regarding which sites are permitted to act as referrers since a referring site can substitute one W-UAI for another, even without knowing how to decrypt them. The most conservative approach would be for client sites 502 only to refer Users back to the portal 500, which can then refer Users to any client site 502. In this approach, both the portal 500 and client sites 502 place session markers (preferably memory-only session cookies) on the User's browser 89. The client's session marker keeps the User from being challenged during interactions with the client site 502 and would have a modest time out period. The portal's marker, on the other hand, preferably has a very long time-out (such as four or more hours although as a session cooking it will terminate when the User's browser closes) since being passed from a referring site via a facilitating link is sufficient evidence of recent activity.

In certain situations, the portal Operator may desire that the Users be able to directly access client sites 502, rather than having to pass through the portal 500. This adds complexity since each client 502 will need to communicate directly with the Registration Authority server 82 in order to obtain authorization for certain transactions.

The Web portal 500 and the Registration Authority 82 manage their sessions independently of one another, since if one relied on the other, that reliance could be abused and permit session theft. The result is that a User will be prompted to enter a new ID (but not re-authenticate at the Registration Authority) whenever the User first visits a site that does not rely on an authorization already obtained at another Operator's site (i.e., the portal) during the current session.

In accordance with this second solution, when a User arrives at a client site 502 that is willing to rely on another Operator's authorization, but that nonetheless wants independent confirmation of authentication, the client site 502 queries both the Web portal 500 and the Registration Authority server 82 for the User's identity (encrypted version of the UAI) and the status of the User's sessions. Note that the client site 502 cannot access the session information directly at the portal or Registration Authority without providing an opportunity for collusion with other clients able to access the session key values. Therefore, either the User must be passed first to the Web portal 500 and then to the Registration Authority server 82 for session validation, or an element(s) of the User's browser 89 must be activated to communicate with the portal 500 and the Registration Authority server 82 on behalf of the client site 502. In either case, the User is spared having to remember Web IDs for multiple sites, or having to enter a WebID other than at the portal, since the client site is willing to rely on the identity provided by the portal since it is confirmed by the Registration Authority.

This second solution requiring interaction with both the portal and the Registration Authority is preferable in terms of both performance and user interface. However, the first solution is preferable for portal client sites who have less need for security, since it requires only that the client site communicate with the portal rather than both portal and Registration Authority. A portal may choose to implement either or both methods depending on the security needs of its client sites. A portal may even choose to implement a third party single sign-on ("SSO") system for use with its client sites.

Unfortunately, no third party SSO system currently supports multiple, independent, de-identified domains providing collusion resistance against re-identification at a level at all similar to that provided in this invention. This means that, at best, third party SSO systems must lump all de-identified client sites into one name space using the same anonymous ID for the User at every de-identified client site. A different instance of the third party SSO system must be run with a different, not necessarily anonymous ID shared by all the identified client sites. The portal must also create custom code for bridging between the identified and de-identified sides of the portal.

The advantage of such an approach is that some third party SSO systems provide very sophisticated SSO capabilities not requiring facilitating links and strong security on the actual SSO transactions. The crucial disadvantage of this approach in today's regulatory environment, particularly as pertains to sites benefiting from de-identified medical data, is that since all de-identified client sites use the same anonymous ID, re-identification at one client site leads directly to re-identification at all. Those of ordinary skill of the art will appreciate that, on the other hand, the present invention limits re-identification to at most one site per successful attack (except for total corruption of either the Registration Authority or the portal and its cryptographic systems) since each site uses a different anonymous ID.

To support the latter method, the portal 500 and the Registration Authority server 82 independently install signed applets on the User's browser 89 the first time the User logs on to the portal from that browser. At the start of each session, these applets are given a strongly random (e.g., 128-bit or higher) session ID in a token with a relatively long time-out (e.g., multiple hours). The client site 502 activates each applet by passing it a client parameter (the parameters should be different for each applet to prevent collusion).

Each applet in turn passes its token and client parameter back to its installing site. Each installing site then decrypts the token and creates a new token with an updated time stamp and MAC and passes the new token back to the applet, and passes the UAI encrypted under the client's key (those of ordinary skill in the art will appreciate that it is a statistical impossibility that any of the UAIs, client keys, or encrypted UAIs will be the same for a given client between the Registration Authority and the portal since the UAIs and keys are independently created strong randoms of 128-bits or higher), session status, and client parameter server to server back to the client site either by a token encrypted for that client site and passed along by the applet on the browser, or preferably by direct site-to-site communication via VPN or client-side SSL (for infrequent communications not cost justifying a permanent VPN link) with the client site 502.

The client site 502 then maps the W-UAIs to application IDs and checks the session statuses. If the session status is valid, the User is authorized and granted access. If a session status is invalid, the User is redirected to the Web portal 500 for re-authorization, and possibly from the portal 500 to the Registration Authority server 82 re-authentication. If the W-UAIs do not map to the same application ID, an error with possible security implications is reported to both the Web portal 500 and the Registration Authority server 82.

Although the Registration Authority cannot manage another authorizing party's ("AP") session (e.g., a Web portal), it can coordinate the sessions managed by any number of APs during a single session. In one embodiment, the APs are responsible for informing the Registration Authority whenever a User's session is refreshed. This in turn means that client sites of the APs are responsible for informing the AP whenever the User interacts with the client's site (although not necessarily what the interaction is). The Registration Authority then makes a User's recency information (but not necessarily who provided it) available on demand to any AP which has asked the Registration Authority to authenticate that User during the current session. The APs then use Registration Authority-provided recency information to refresh their stale authorization sessions based on the User's activity with other authorizing sites.

To reduce recency related traffic, each AP preferably caches authorization session recency updates rather than sending them on immediately to the Registration Authority. The AP periodically notifies the Registration Authority regarding recency updates at a specified time interval.

To prevent attacks from a corrupt Registration Authority, an AP may choose not to refresh a stale authorization session if the session is too stale (and might report the attempt to refresh a "too stale" session to both the Registration Authority's and AP's active defenses, particularly any manned third party active intrusion detection monitoring organizations). What that maximum staleness interval should be is strictly up to the AP (but should be known to and honored by the Registration Authority), since it does not affect the Registration Authority session and only requires the User to make one additional application ID entry when returning. Some very sensitive sites may even choose never to refresh a stale session based on Registration Authority maintained recency information. Such sites are nonetheless responsible for sending recency information to the Registration Authority, since they may still take advantage of the Registration Authority's session to avoid having their Users re-authenticate at the Registration Authority. If a pre-determined excessive period passes without any site notifying the Registration Authority of a recency update, then the Registration Authority may time-out its session.

f. Customization

Once the User has logged on the Web site 10, the User may freely navigate and search for information of interest to the User. However, the User may also seek to enjoy customized service. In order to receive customized service, the User will, upon login, elect to receive customized service by transmitting his/her customization activation code to the Web server 54. The Web server 54 will then check the User database 44 to make sure that the customizations activation code presented by the User is valid. Once customizations are activated, they will remain activated for all subsequent logins until they are de-activated by unchecking a personal customizations box. However, customizations may be reactivated just by clicking the box to add a check. Barring administrative interventions such as account recovery, the activation code only needs to be used once.

In order to provide customized services to the Users based on their respective medical histories, each Web page (or link) on the Web site is indexed by ICD-9-CM, CPT-4, NDC and HCPCS J-codes in addition to keyword. This indexing is realized through use of the link table 46. The link table 46 is a list of the URL of every Web page on the Web site 10 with corresponding keywords, ICD-9-CM, CPT-4, NDC and HCPCS J-codes in their respective columns. The codes are assigned to particular Web pages by trained medical professionals based on the content of the particular Web pages. The assignments are highly discretionary and will vary from medical professional to medical professional. It will be appreciated by those of ordinary skill in the art that the present invention is not limited to the foregoing coding systems, but may be used with any coding system.

Referring to FIG. 10, in accordance with one method of customization, the Web server 54 may be configured so that upon login to the Web site 10 by a User, the ICD-9-CM, CPT-4, NDC, and HCPCS J-code history of the User as found in the User database 44 is compared to the link table 46. For each Web page having an associated code that matches any of the User's codes, the Web page is suggested to the User for browsing. The benefits of this method of customization will be apparent to those of ordinary skill in the art. Rather than suggesting Web pages based on the browsing history of the User, Web pages are suggested to the User based on the User's unique medical history, resulting in a highly informed customization process. This method of customization can also be accomplished through the search engine, as discussed below.

In accordance with another method of customization, customization may also be provided using the search engine 22. Typical prior art search engines use keywords to search the Web site. However, because the entire Web site 10 is indexed by medical codes in addition to keyword (as used herein, the term "keyword" includes individual words as well as phrases), the User's medical code history may be used to modify and enhance the search so that more relevant information is returned to the User.

Figure 11:
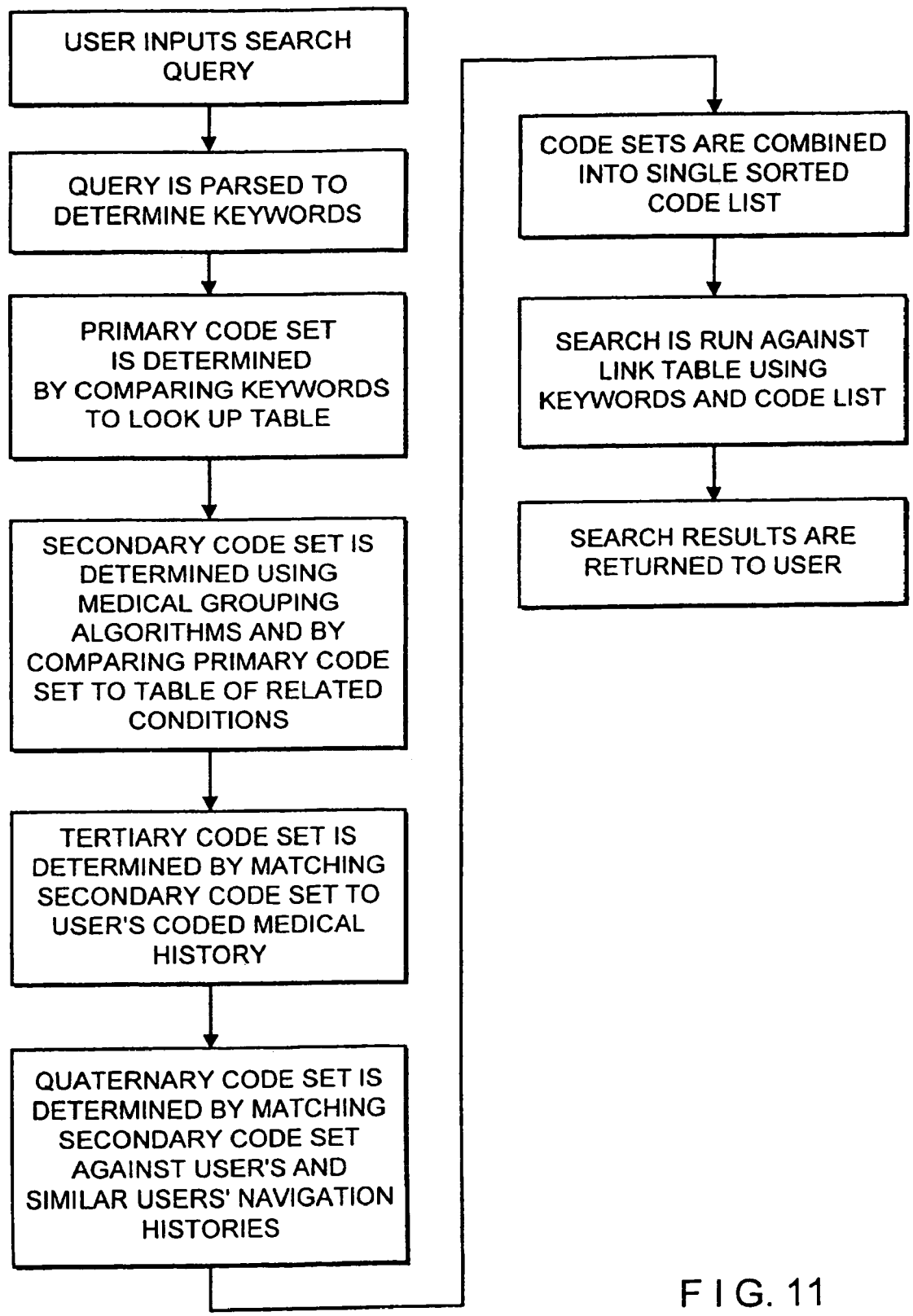
FIG. 11 is a chart summarizing a second method of customization via the search engine in accordance with one embodiment of the present invention.

Referring to FIG. 11, the User will input a query to be searched. A spell checker portion of the search engine 22 proposes corrections which the User might approve. The query is then parsed and phrases are identified and removed therefrom. Individual words are then identified from that part of the query which is not a key phrase.

The keywords (phrases and individual words) are then matched to medical codes through comparison to the keyword to ICD-9-CM/CPT-4/NDC/HCPCS J-code look up table 48. The keyword to ICD-9-CM/CPT-4/NDC/HCPCS J-code look up table 48 is a table that correlates keywords to by ICD-9-CM, CPT-4, NDC and HCPCS J-codes related to the keywords. Entries in the table are made by trained medical professionals on a discretionary basis.

The medical codes retrieved from the look up table 48 form a "primary code set". The codes in the primary code set are assigned a relevancy score based on how many keywords matched to them. Medical codes used in the search process include, but are not limited to, ICD-9-CM, CPT4, NDC, and HCPCS J-codes.

The primary code set is next input into a variety of medical code grouping algorithms, producing a set of medical code groups. These groupings include a variety of third party tools used to associate medical codes into larger sets for a variety of purposes. Among those groupings lending themselves to usage as is required to expand the medical code search set are the Johns Hopkins ACG (Adjusted Clinical Groups) and DxCG Inc.'s DCG-HCC (Diagnostic Cost Groups—Hierarchical Coexisting Conditions).

A "secondary code set" is extracted from each medical code group by running the grouper backwards to produce all of the many codes that can potentially contribute to the group. In addition to the codes returned by running the medical groupers backwards, codes related to those in the primary set are derived from the table of related conditions 50 and are added to the secondary code set. The table of related conditions 50 is a list of ICD-9-CM, CPT-4, NDC and HCPCS J-codes codes in their respective columns and related ICD-9-CM, CPT-4, NDC and HCPCS J-codes in their respective columns. As with the keyword to ICD-9-CM/CPT-4/NDC/ HCPCS J-code look up table, code relatedness is determined by trained medical professionals and is highly discretionary. The codes in the secondary set are assigned a relevancy score based on how many groups produced the code.

The secondary code set is then matched against medical codes from the User's medical history in the User database 44. Those secondary codes which are also in the history from a "tertiary code set". Each code in the tertiary code set is assigned a relevancy score based on the code's score in the secondary set and the recentness of the occurrence of the code in the User's medical history.

A "quaternary code set" is produced by matching the secondary code set against codes from the User's site navigation history and the site navigation histories of similar Users, as contained in the User tracking database 52, which lists the Web pages previously visited by each User, along with the ICD-9-CM, CPT-4, NDC and HCPCS J-codes corresponding to those Web pages. Each time the User visits a Web page, the Web page URL and associated codes are recorded in the tracking database 52. The codes in the quaternary set are assigned relevance scores based on relatedness to the User, frequency of use, and recentness of use.

The four sets of codes are combined into a single sorted list in the following manner:

1. Those codes in the primary set which are also in the tertiary and quaternary sets come first. The codes are put in order by their primary set relevance scores with ties in order by their tertiary set relevance scores, with remaining ties in order by their quaternary set relevance scores.

2. The remaining codes in the primary set which are also in the tertiary set come next, ordered by primary then tertiary scores.

3. The remaining codes in the primary set which are also in the quaternary set come next, ordered by primary then quaternary scores.

4. The remaining codes in the primary set which are also in the secondary set come next, ordered by primary then secondary scores.

5. Any remaining codes in the primary set come next, ordered by primary scores.

6. The remaining codes in the tertiary set which are also in the quaternary set come next, ordered by tertiary then quaternary scores.

7. Any remaining codes in the tertiary set come next, ordered by tertiary scores.

8. Any remaining codes in the quaternary set come next, ordered by quaternary scores.

9. Lastly come any remaining codes in the secondary set, ordered by secondary scores.

The search query is then modified to include the sorted code list in addition to the keywords. The search is run against the link table 46 and the results are displayed for the User.

Preferably, the search engine 22 will have a basic search function and an advanced search function. In the basic search function, for each of seven content categories—Care Guide, Disease Guide, Medical Encyclopedia, Medical Dictionary, Drug Guide, Medical News, and User Forums—the sorted list of codes is matched in sorted order to the content until 3 items are found for each category. If less than 21 items are produced, then the remaining content "slots" are filled by matching the codes in sorted order to all content, discarding content already used to fill a slot. In the advanced search function, the User can specify how many slots, including "unlimited", should be filled for each content category, and which categories should come before which others on the result list.

When a User who has activated customization logs in to the Web site 10, a search using the search engine 22 may be automatically run on behalf of the User. This will be a basic search on the medical codes from the User's recent medical history, the User's gender, age, the top 20 codes from the User's site navigation history, and the top 20 codes from the site navigation history of similar Users. The User does not see the actual query. However, the 21 results are automatically presented whenever the User logs in or submits a blank query. These 3 most relevant selections from each of the 7 content areas will provide Users with the medical information most relevant to their current conditions and demonstrated interests.

Referring to FIG. 12, in accordance with another method of customization, it is also possible to customize the Web browsing experience through use of the tracking database 52. By comparing the ICD-9-CM, CPT-4, NDC and HCPCS J-codes codes in the User's tracking database entry with the link table 46, additional Web pages which have matching by ICD-9-CM, CPT-4, NDC and HCPCS J-codes may be suggested to the User.

Figure 13:
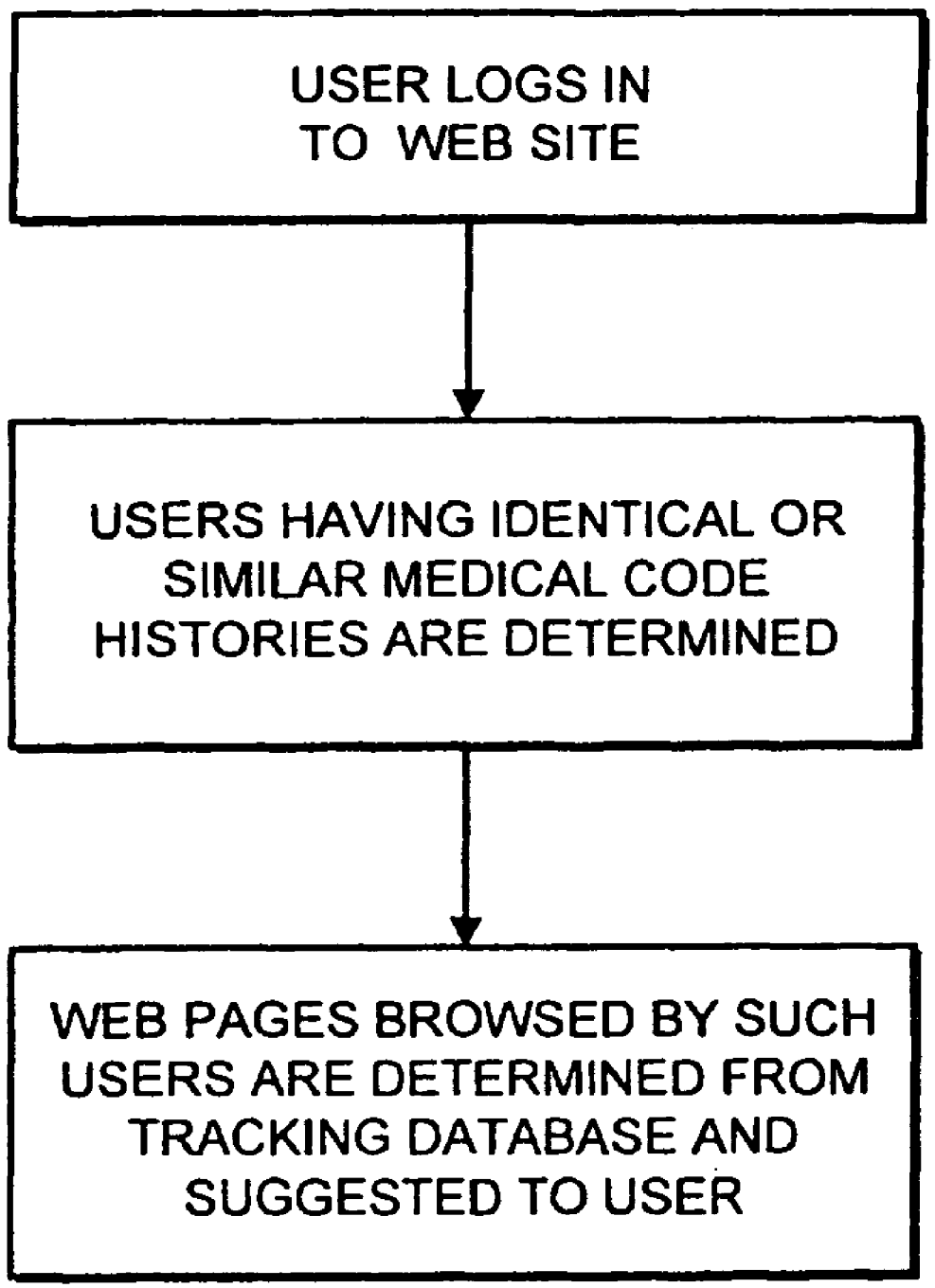
FIG. 13 is a chart summarizing a fourth method of customization in accordance with one embodiment of the present invention.

Referring to FIG. 13, in accordance with another method of customization, the tracking database 52 also makes it possible to customize based on where other Users with similar medical histories have browsed. Thus, Web pages which have been visited by Users having identical or similar ICD-9-CM, CPT-4, NDC and/or HCPCS J-codes may be suggested to the User. For example, assume that a User has disease X which is indicated by ICD-9-CM code Y. Upon login, the Web server 54 may be configured to search the tracking database 52 and suggest Web pages to the User which were visited by other Users having ICD-9-CM code Y in their medical histories.

In accordance with another method of customization, use of ICD-9-CM, CPT-4, NDC and HCPCS J-codes also makes it possible to develop content profiles into which Users having specifically similar medical histories, i.e. identical or very similar code combinations, may be grouped. For example, patients experiencing chest pain (ICD-9-CM 786), angina pectoris (ICD-9-CM 413), myocardial infarction (ICD-9-CM 410, 412) and ischemic heart disease (ICD-9-CM 414) may undergo procedures such as cardiac catheterization, angioplasty and coronary artery bypass graft surgery (CPT-4 33200-33235, 33305, 33315, 33332-33335, 33510-33536, 33999, 36013-36015). This grouping allows the customization and delivery of a body of knowledge to a group of people at different points in the spectrum of the same disease process.

Content profiles are determined by trained medical professionals and are largely discretionary. Thus, the Web server 54 may be configured on log in to look up in the User database 44 all Users having the same content profile(s) as the logged on User. The Web server 54 then looks those Users up in the tracking database 52 and suggests to the User the Web pages previously visited by those Users.

In accordance with another method of customization, the tracking database 52 also provides means for statistically tracking Web site usage of Users having similar medical conditions. By analyzing the browsing habits of Users having similar medical conditions, statistically relevant Web pages may be suggested to each such User. As an example, based on ICD-9-CM codes, the Operator can determine, by consulting the User database 44, which of its Users have disease X. By then consulting the tracking database 52 and statistically analyzing the browsing preferences and patterns of Users who have disease X, the Operator may make meaningful statistical determinations as to which Web pages will likely be of interest to Users having disease X. Those Web pages may then be suggested to any User having disease X who logs on to the Web site.

The foregoing embodiments illustrate only a handful of ways in which a User's browsing experience may be customized in accordance with the present invention. It will be realized by those of ordinary skill in the art, however, that the present invention is not limited to the foregoing embodiments. Rather, this invention is extremely versatile and may be used to provide a customized browsing experience in an unlimited number of ways.

It will also be apparent to those of ordinary skill in the art that while the UAI method will be preferably used to ensure privacy of the Users' medical histories, the present invention as it relates to customization may be practiced without using UAI's and may in fact be practiced using identifiable medical data if desired.

Thus, in accordance with the foregoing, the objects of the present invention are achieved. Modifications to the above would be obvious to those of ordinary skill in the art, but would not bring the invention so modified beyond the scope of the appended claims.

We claim:

1. A method of making clinical information of a plurality of users accessible for use in an enhanced browsing application, while maintaining the security and privacy of the clinical information, said method comprising the steps:

transferring de-identified clinical information of said users from said first computer to said second computer, said de-identified clinical information being associated with a surrogate ID;

transferring identifiable personal information which lack clinical information from said first computer to a third computer, wherein said third computer does not receive said de-identified clinical information and said second computer does not receive said identifiable personal information;

generating on said third computer an anonymous ID for each user which anonymously identifies the user, each anonymous ID being correlated or correlatable with a surrogate ID;

transferring said anonymous IDs from said third computer to said second computer and assuring that the anonymous IDs are not provided to said first computer; and storing in a database accessible to said second computer said de-identified clinical information of said users indexed by said anonymous IDs, wherein said de-identified clinical information is used when a browser browses information on a web server associated with said second computer;

wherein said surrogate IDs are encrypted using an encryrption key maintained by said first computer;

said identifiable personal information transferred from said first computer to said third computer is indexed by unencrypted surrogate IDs;

said encryption key is transferred to said third computer from said first computer;

said third computer encrypts said surrogate IDs using said encryption key and transfers said encrypted surrogate IDs to said second computer with said anonymous IDs; and said second computer uses said encrypted surrogate IDs transferred from said third computer to correlate said anonymous IDs with said de-identified personal information received from said first computer.

2. The method according to claim 1 wherein said anonymous IDs transferred from said third computer to said second computer are encrypted under an encryption key maintained by said third computer.

3. The method according to claim 2 wherein said de-identified clinical information of said users is indexed by encrypted anonymous ID.

4. The method according to claim 1 wherein said anonymous IDs are transferred from said third computer to said second computer via a virtual private network within the public Internet.

5. The method according to claim 1 including the additional step of transferring said indexed de-identified clinical information from said database to a data warehouse.

6. The method according to claim 5 including the additional step of transferring said indexed de-identified clinical information from said data warehouse to a World-Wide-Web (WWW) site.

7. The method according to claim 1 wherein said first computer is operated by a health plan and wherein said users are members of said health plan.

8. The method according to claim 1 wherein said second computer is operated by an operator of a WWW site.

9. The method according to claim 1 wherein said third computer is operated by a registration authority.

10. The method according to claim 1 wherein said de-identified clinical information includes medical claims data and wherein said identifiable personal information includes eligibility data of said users.

11. The method according to claim 1 wherein said de-identified clinical information of said users includes financial information of said users.

12. The method according to claim 1 wherein said de-identified clinical information of said users includes employee benefits information of said users.

13. A system for making clinical information of a plurality of users accessible for use in an enhanced browsing application, while maintaining the security and privacy of the clinical information, said system comprising:

a first computer containing clinical information of said users;

a second computer for receiving de-identified clinical information of said users transferred from said first computer together with surrogate IDs;

a third computer for receiving identifiable personal information which lacks clinical information transferred from said first computer, wherein said third computer does not receive said de-identified clinical information, and wherein said second computer does not receive said identifiable personal information, said third computer being configured to generate an anonymous ID for each user which anonymously identifies the user, each anonymous ID being correlated or correlatable with a surrogate ID, said third computer transferring said anonymous IDs to said second computer and assuring said anonymous IDs are not provided to said first computer; and a database accessible to said second computer for storing said de-identified clinical information of said users indexed by said anonymous IDs, wherein said database is used when a browser browses information on a web server associated with said second computer;

wherein said surrogate IDs are encrypted using an encryption key maintained by said first computer;

said first computer transfers said encryption key to said third computer;

said third computer encrypts said surrogate IDs using said encryption key and transfers said encrypted surrogate IDs to said second computer with said anonymous IDs; and said second computer uses said encrypted surrogate IDs transferred from said third computer to correlate said anonymous IDs with said de-identified clinical information received from said first computer.

14. The system according to claim 13 wherein said third computer is configured to encrypt said anonymous IDs under an encryption key maintained by said third computer prior to transferring said anonymous IDs to said second computer.

15. The system according to claim 14 wherein said de-identified clinical information of said users is indexed in said database by encrypted anonymous ID.

16. The system according to claim 13 wherein said anonymous IDs are transferred from said third computer to said second computer via a virtual private network within the public Internet.

17. The system according to claim 13 wherein said second computer is configured to transfer said indexed de-identified clinical information from said database to a data warehouse.

18. The system according to claim 17 wherein said indexed de-identified clinical information is transferred from said data warehouse to a World-Wide-Web (WWW) site.

19. The system according to claim 13 wherein said first computer is operated by a health plan and wherein said users are members of said health plan.

20. The system according to claim 13 wherein said second computer is operated by an operator of a WWW site.

21. The system according to claim 13 wherein said third computer is operated by a registration authority.

22. The system according to claim 13 wherein said de-identified clinical information of said users includes medical claims data.

23. The system according to claim 13 wherein said de-identified clinical information of said users includes financial information of said users.

24. The system according to claim 13 wherein said de-identified clinical information of said users includes employee benefits information of said users.

* * * * *